US010324677B2

(12) United States Patent
Tomonaga et al.

(10) Patent No.: US 10,324,677 B2
(45) Date of Patent: Jun. 18, 2019

(54) TRANSMISSION AND DISPLAY OF IMAGE SIGNALS BASED ON MULTICAST TRANSMISSION

(71) Applicant: SONY CORPORATION, Tokyo (JP)

(72) Inventors: Seishi Tomonaga, Kanagawa (JP); Koichi Ogasawara, Tokyo (JP); Atsushi Maruyama, Tokyo (JP); Masayuki Imanishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/895,845

(22) PCT Filed: May 28, 2014

(86) PCT No.: PCT/JP2014/002835
§ 371 (c)(1),
(2) Date: Dec. 3, 2015

(87) PCT Pub. No.: WO2014/199579
PCT Pub. Date: Dec. 18, 2014

(65) Prior Publication Data
US 2016/0132280 A1 May 12, 2016

(30) Foreign Application Priority Data
Jun. 10, 2013 (JP) .................................. 2013-121755

(51) Int. Cl.
G06F 15/16 (2006.01)
G06F 3/14 (2006.01)
G06F 3/147 (2006.01)
G06T 1/20 (2006.01)

(52) U.S. Cl.
CPC ............ *G06F 3/1438* (2013.01); *G06F 3/147* (2013.01); *G06F 3/1446* (2013.01); *G06F 3/1454* (2013.01); *G06T 1/20* (2013.01); G09G 2300/026 (2013.01); G09G 2360/06 (2013.01); G09G 2370/022 (2013.01); G09G 2370/20 (2013.01)

(58) Field of Classification Search
CPC .... G09G 5/363; G09G 5/393; G09G 2360/06; G06T 1/20; G06T 15/005
USPC ......................................................... 345/502
See application file for complete search history.

(56) References Cited

U.S. PATENT DOCUMENTS 7,729,350 B2 * 6/2010 Singh ...................... H04L 12/18
370/390
8,606,949 B2 * 12/2013 Wogsberg .............. H04N 7/181
345/1.1
(Continued)

Primary Examiner — Gordon G Liu
(74) Attorney, Agent, or Firm — Chip Law Group

(57) ABSTRACT

Provided is an image transmission system including an image control device, and at least two signal processing devices. The signal processing devices each include an image receiver configured to selectively receive one or more images transmitted using multicast based on image control information transmitted from the image control device, one or more image processing units configured to perform an image process on an image received by the image receiver based on the image control information, and an image sender configured to transmit an image subjected to the image process by the image processing unit based on the image control information, the image being transmitted using multicast.

32 Claims, 32 Drawing Sheets

(56) References Cited

U.S. PATENT DOCUMENTS

| | | | |
|---|---|---|---|
| 2006/0173985 A1* | 8/2006 | Moore | G06F 17/3089 |
| | | | 709/223 |
| 2006/0238648 A1 | 10/2006 | Wogsberg | |
| 2010/0110167 A1 | 5/2010 | Harada et al. | |
| 2011/0093911 A1* | 4/2011 | Szucs | H04N 7/173 |
| | | | 725/118 |
| 2012/0242893 A1 | 9/2012 | Akitomo | |

* cited by examiner

[Fig. 1]
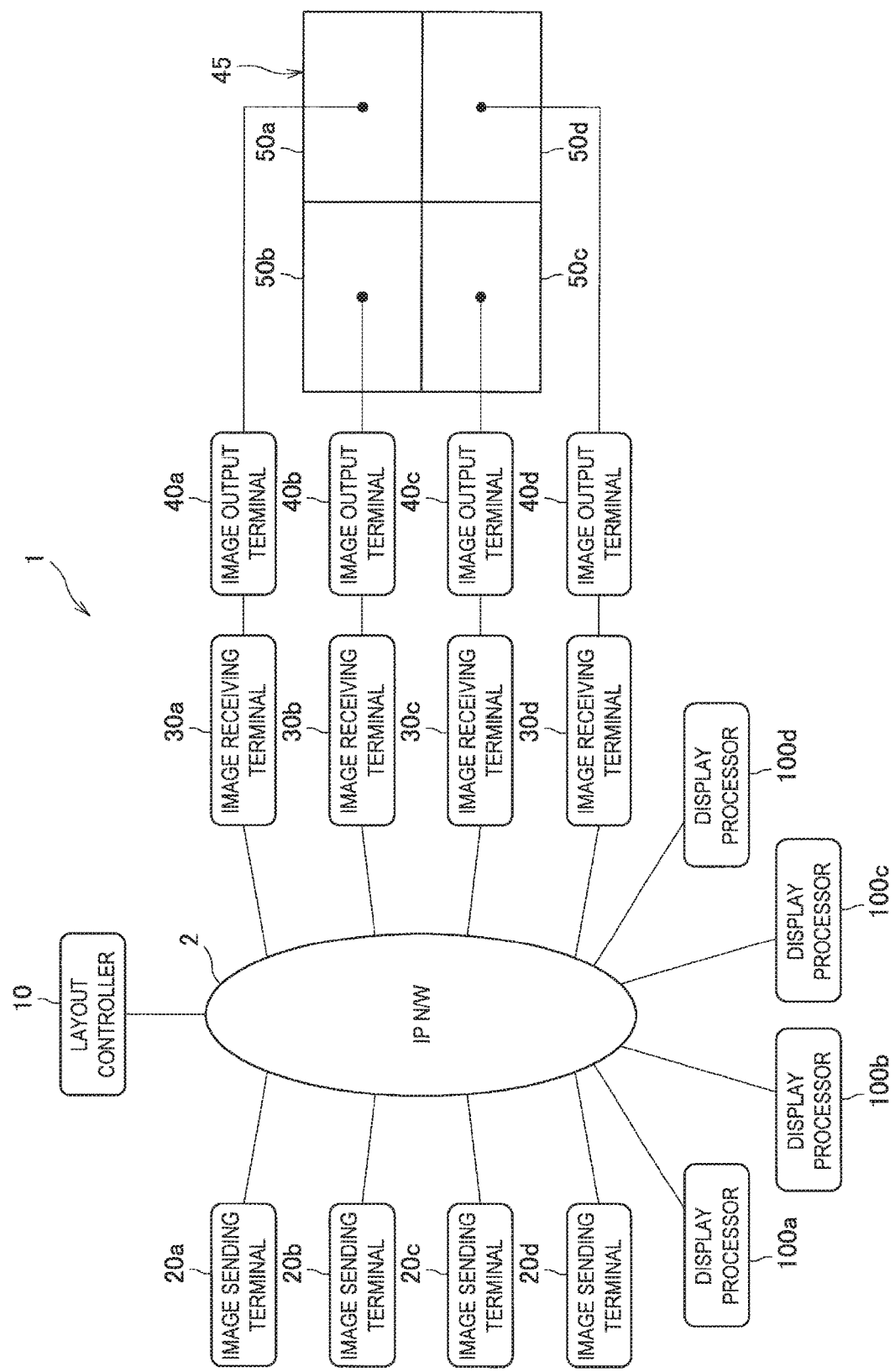

[Fig. 2A]
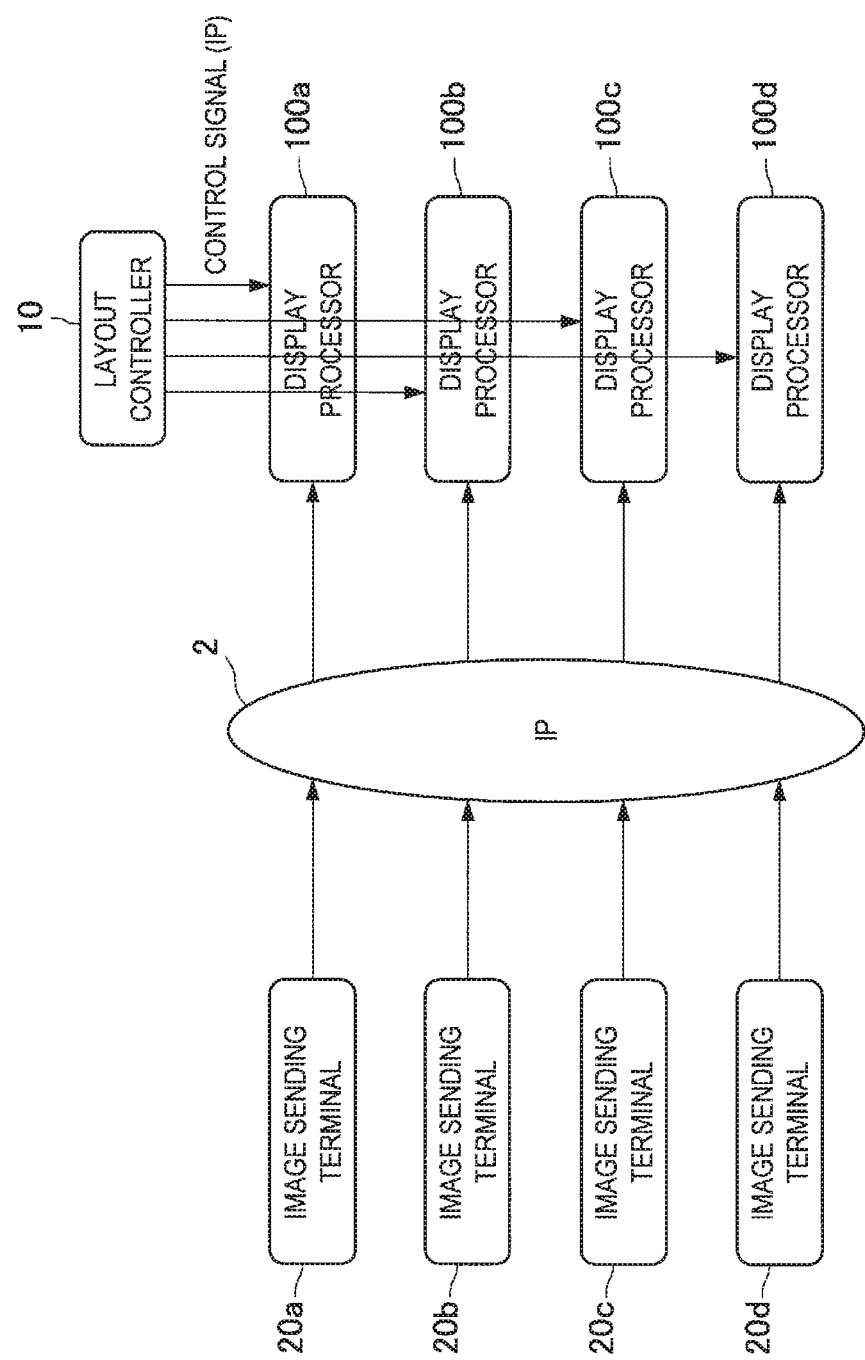

[Fig. 2B]
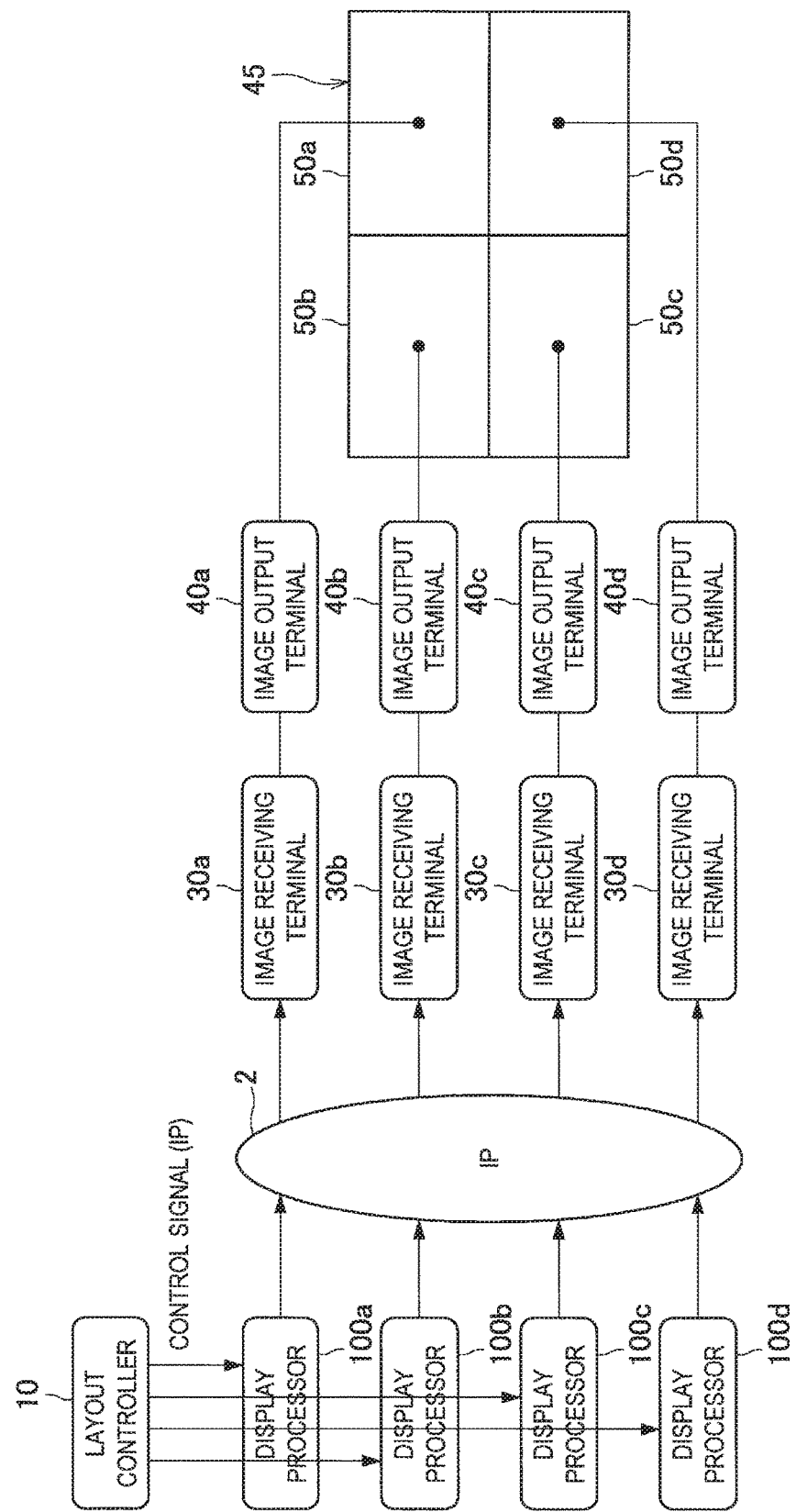

[Fig. 3]
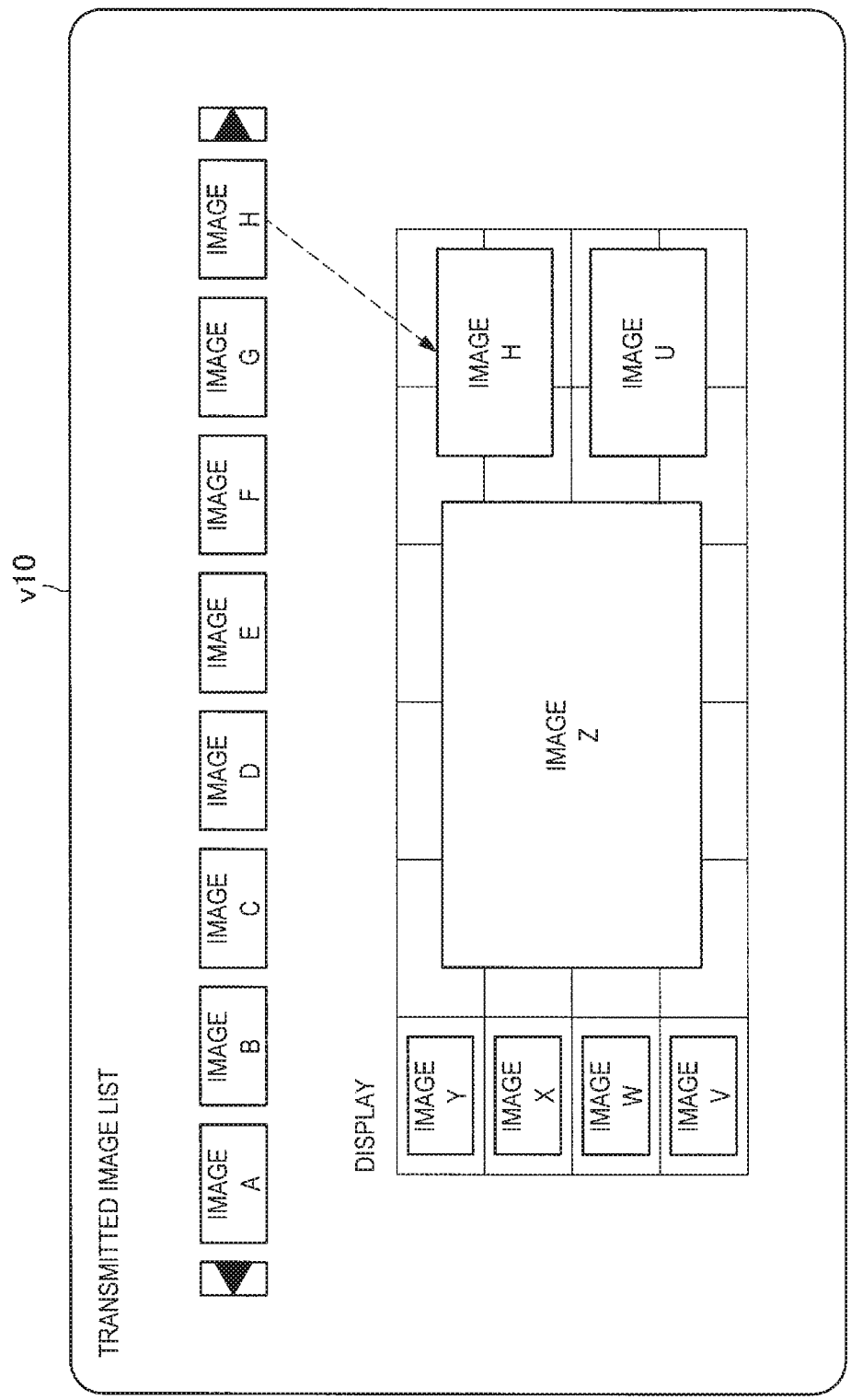

[Fig. 4]
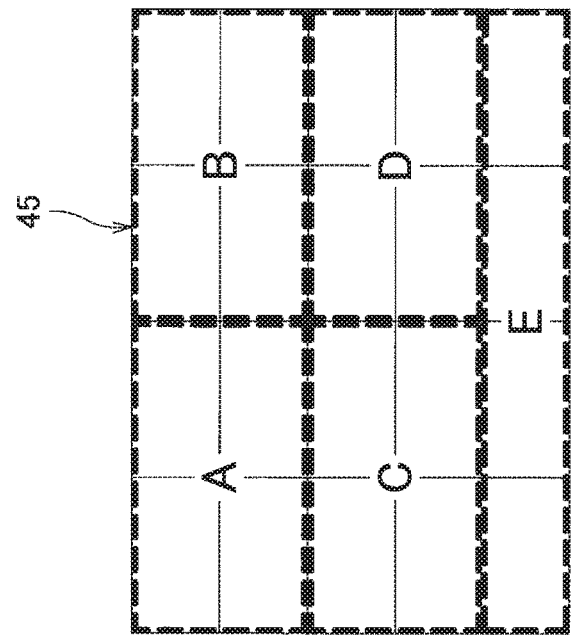
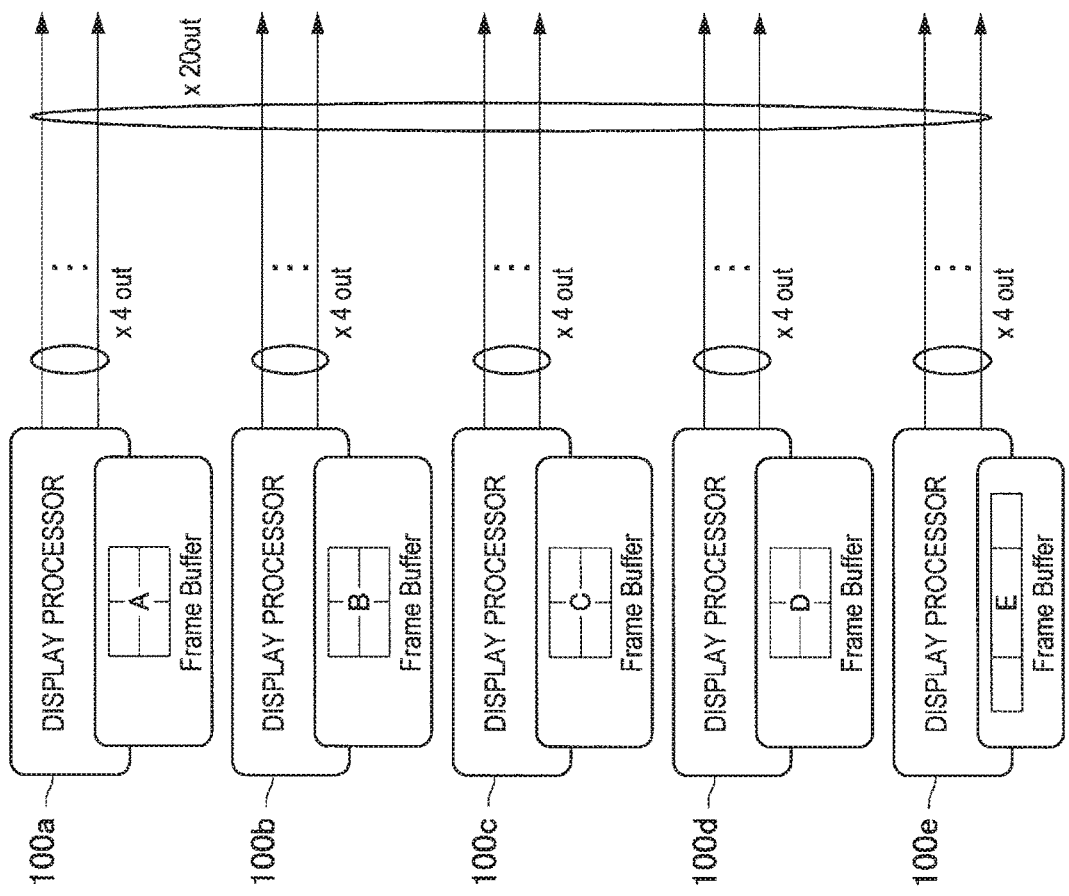

[Fig. 5]
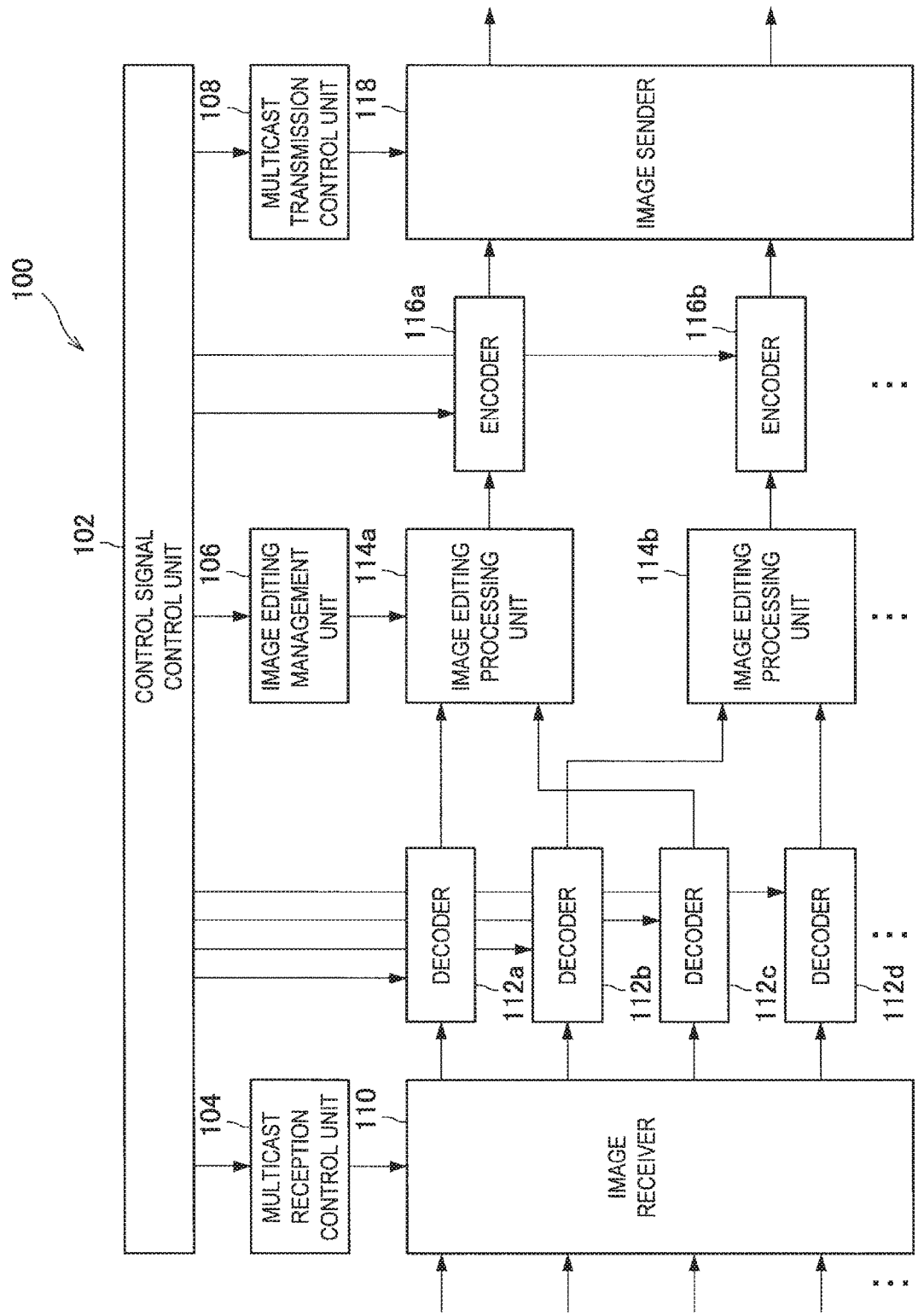

[Fig. 6]
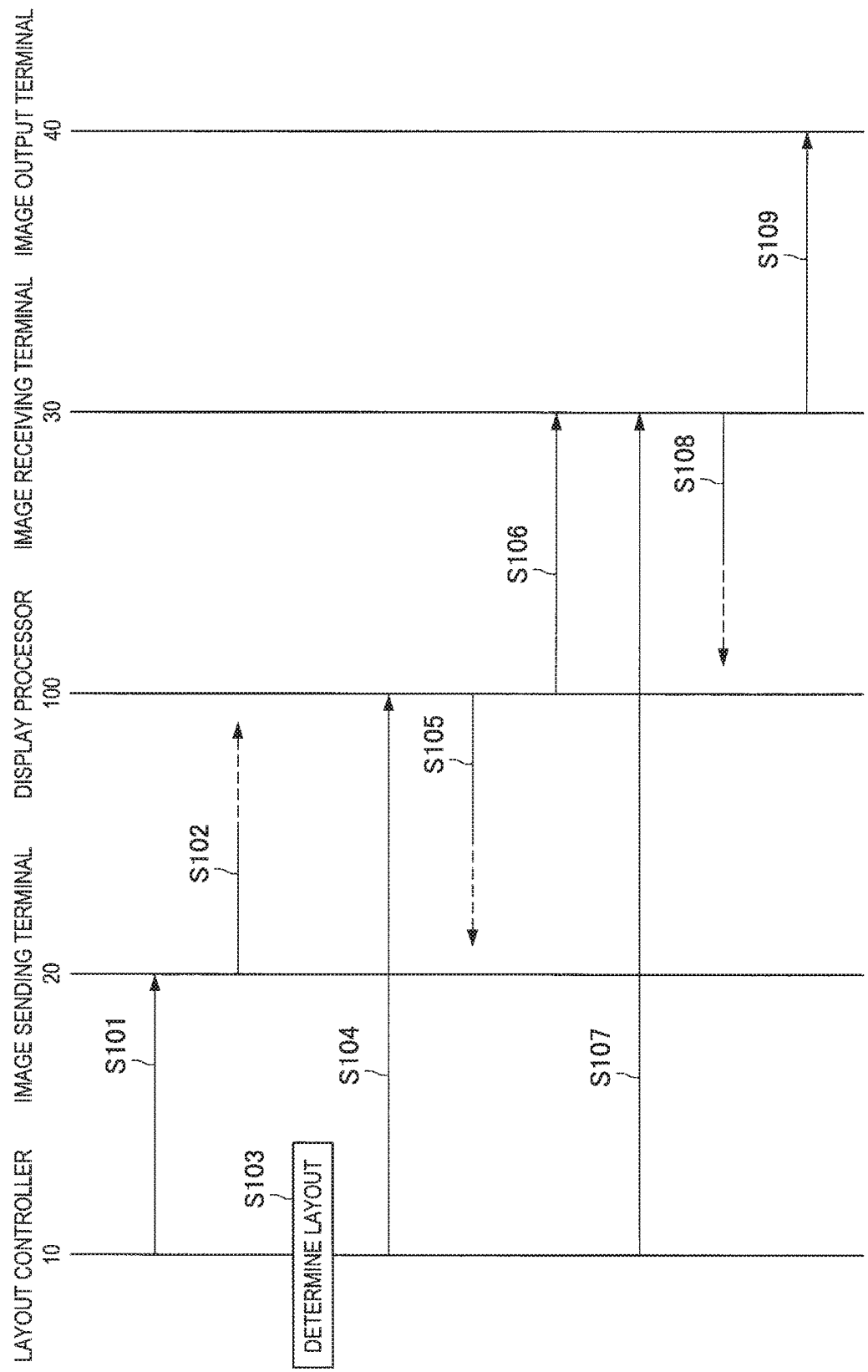

[Fig. 7]
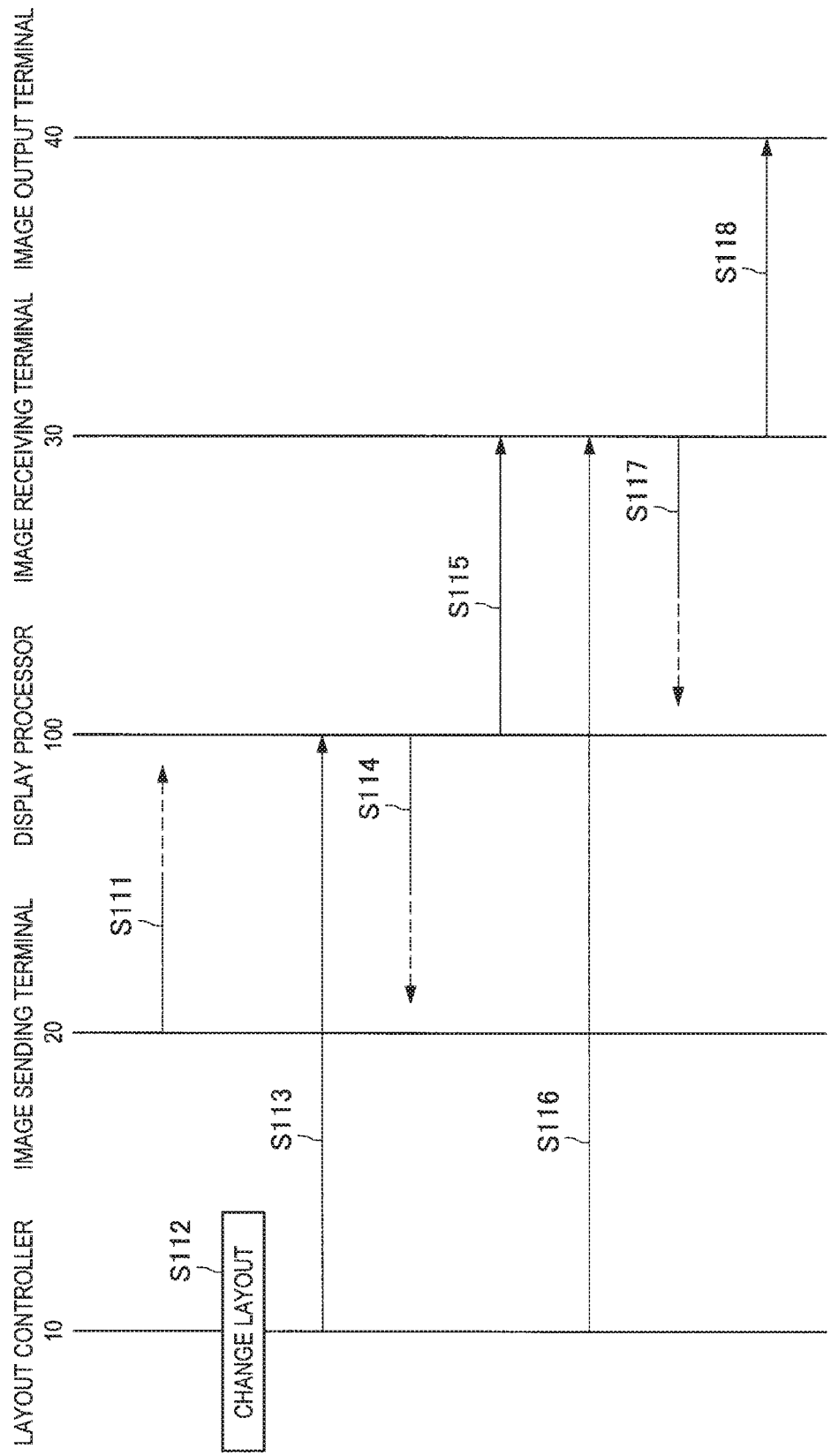

[Fig. 8]
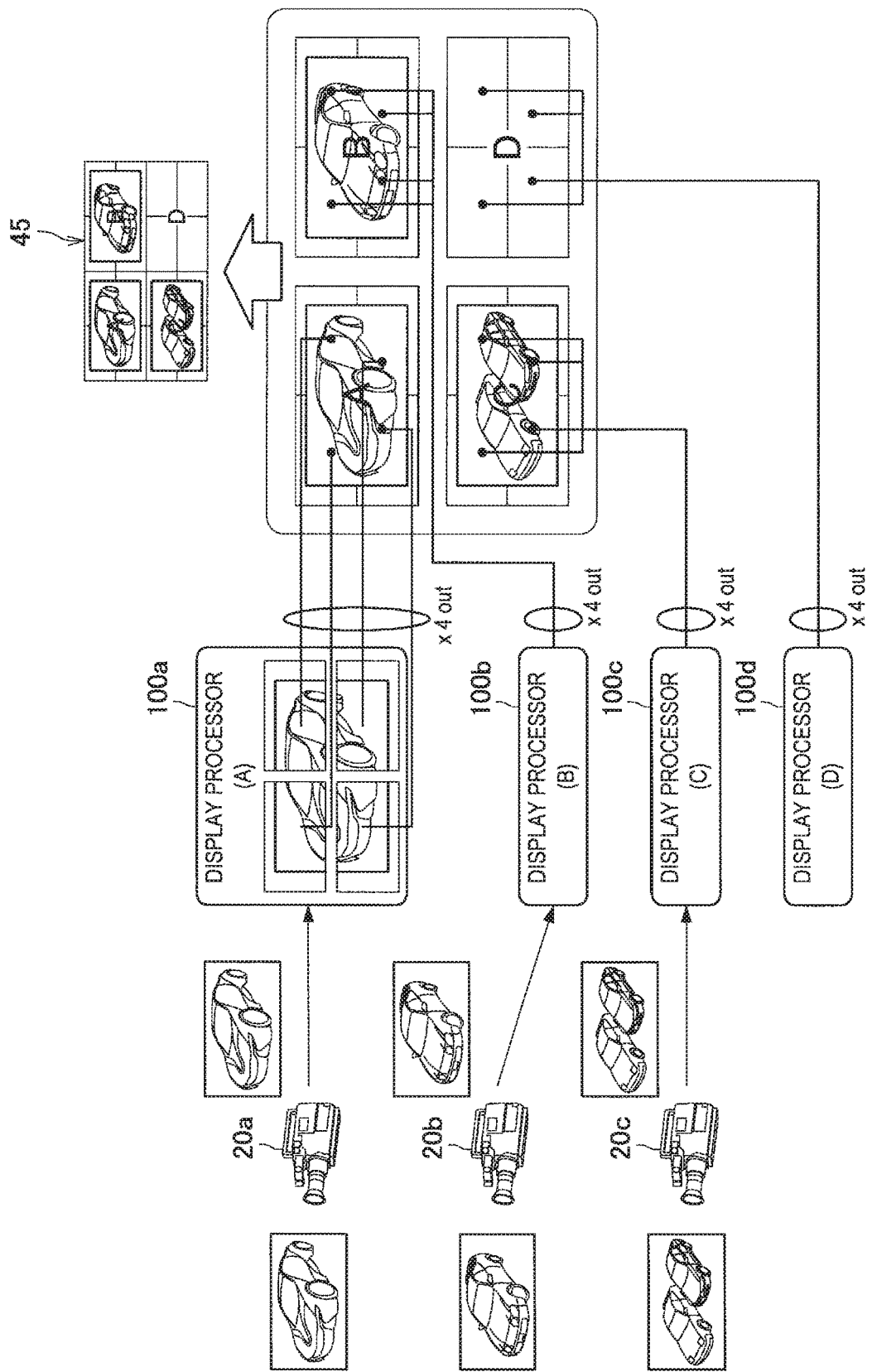

[Fig. 9]
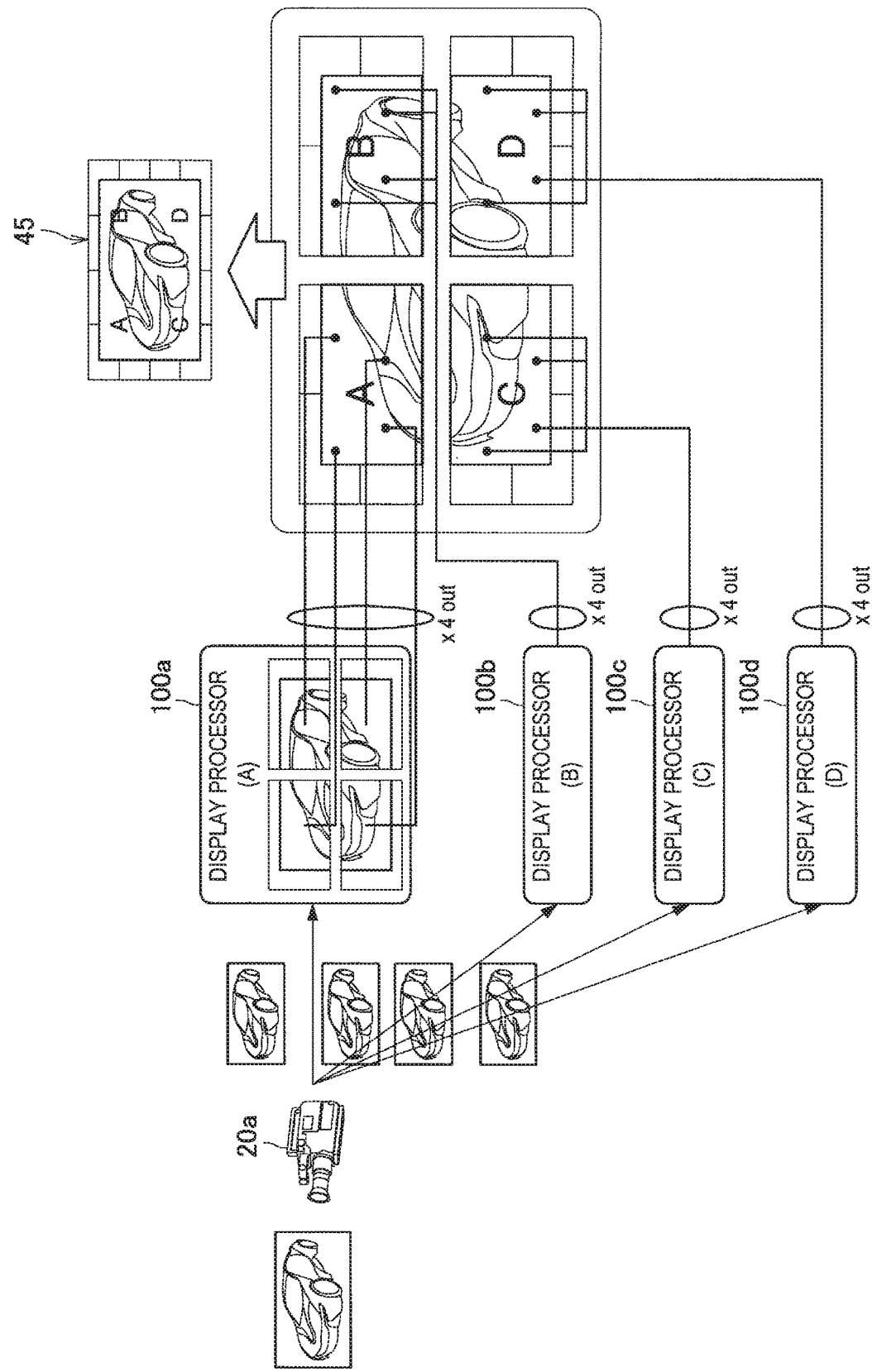

[Fig. 10]
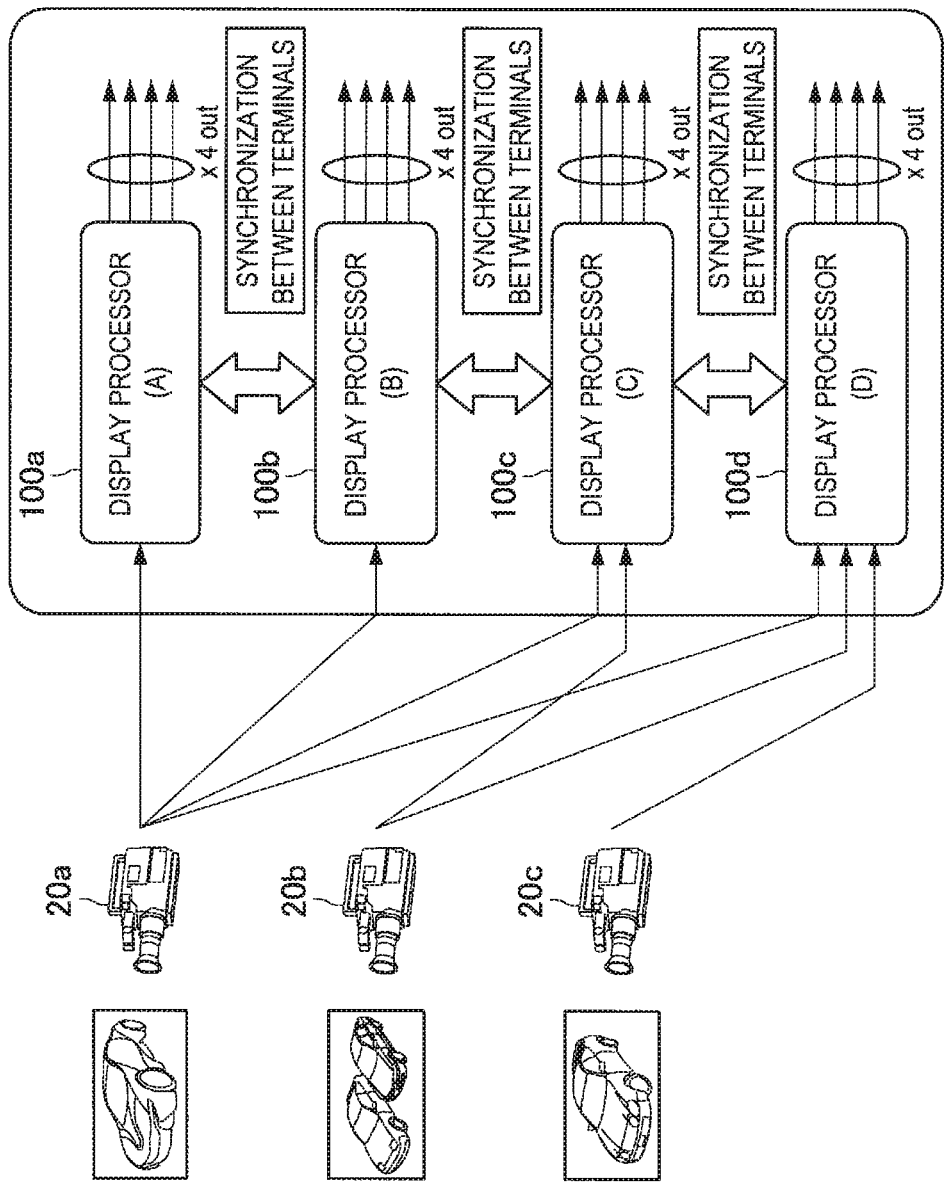

[Fig. 11]
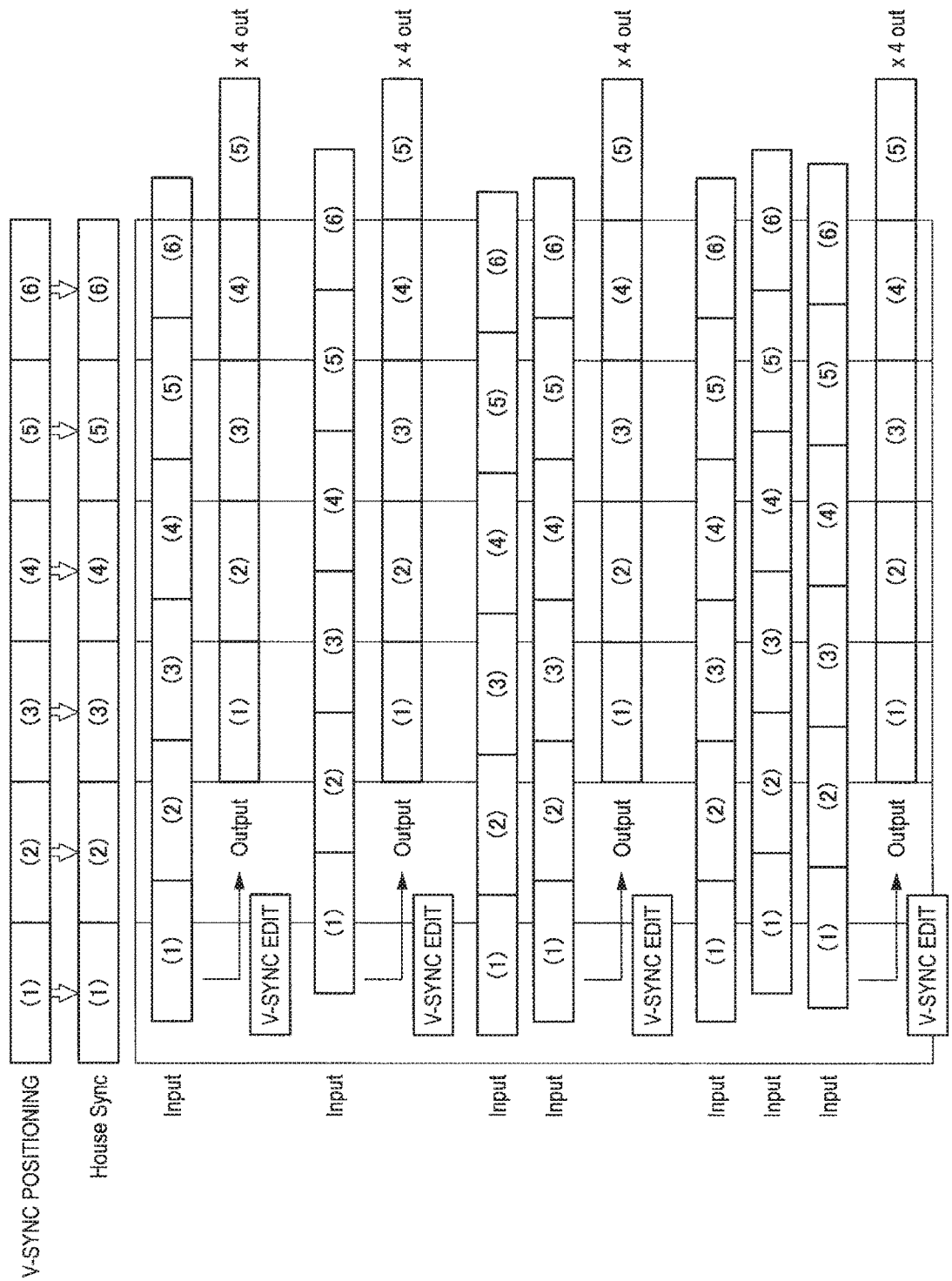

[Fig. 12]
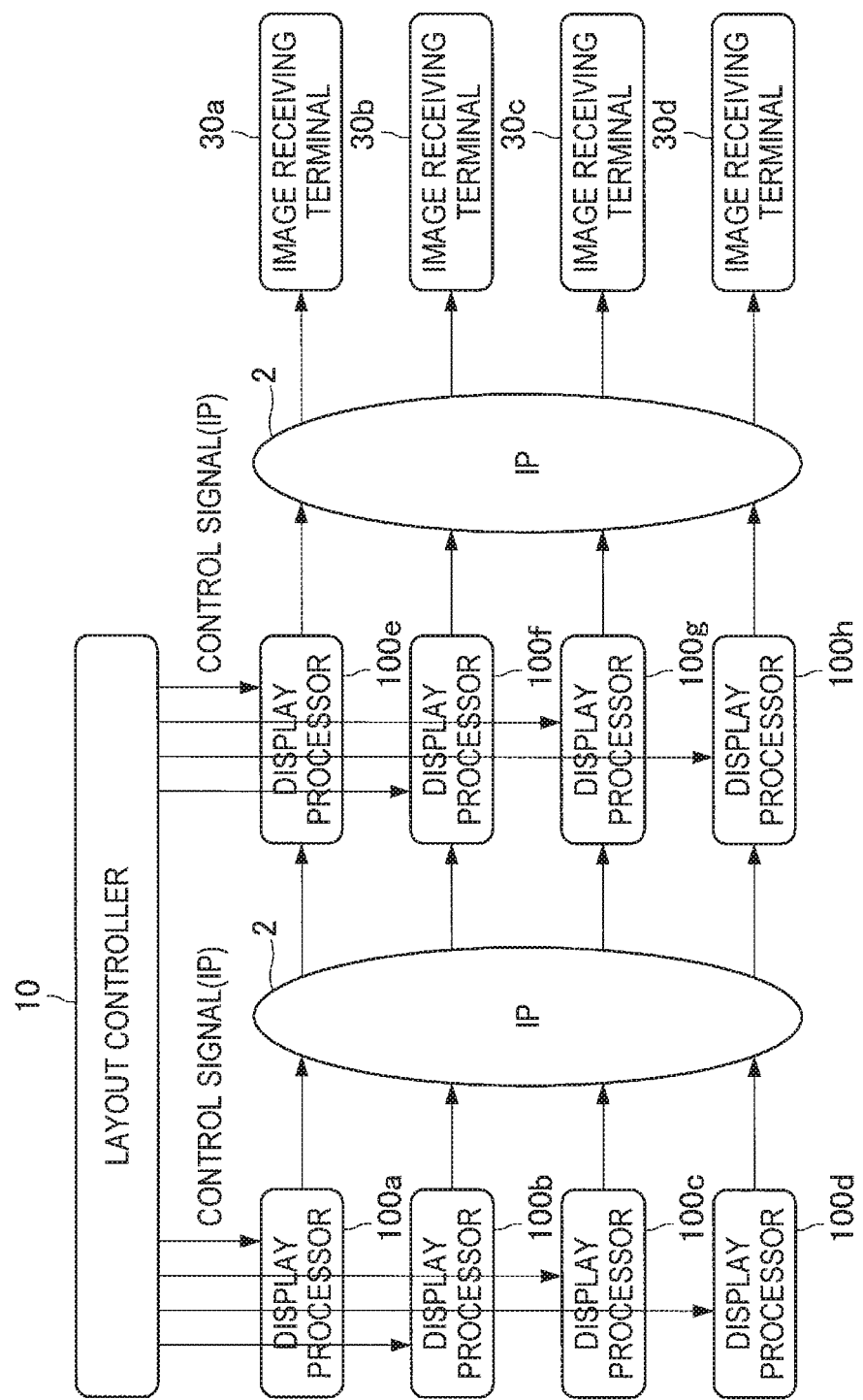

[Fig. 13]
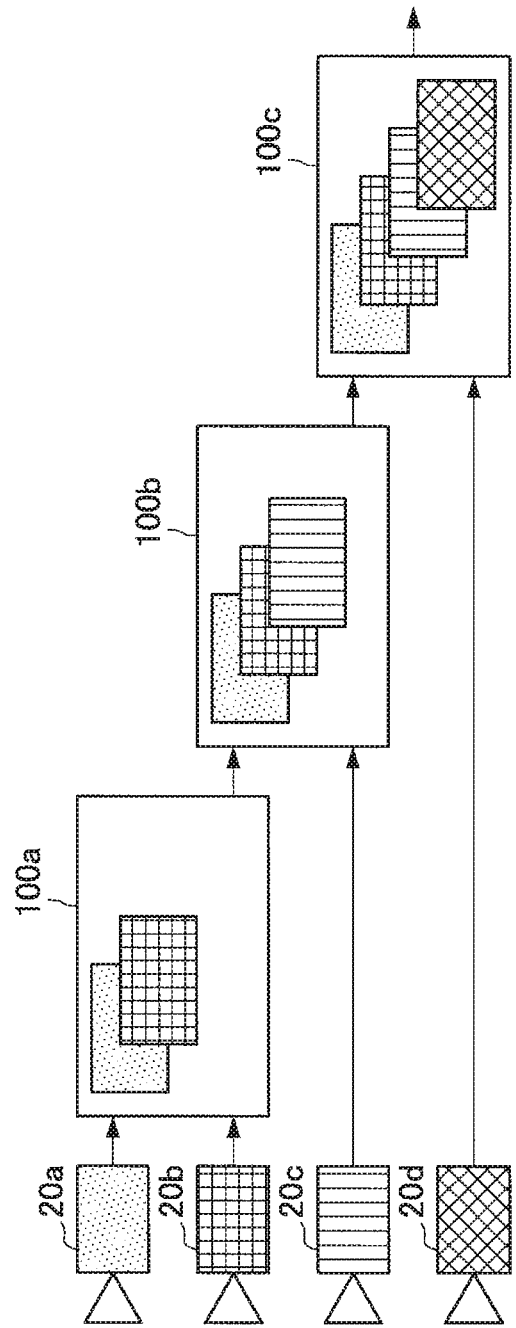

[Fig. 14]
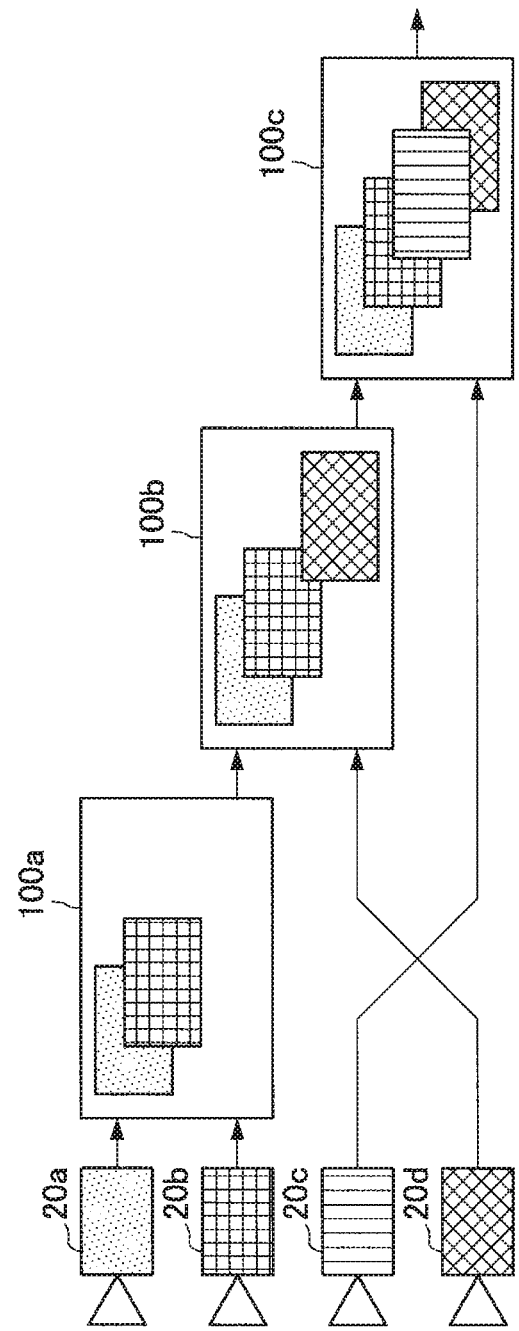

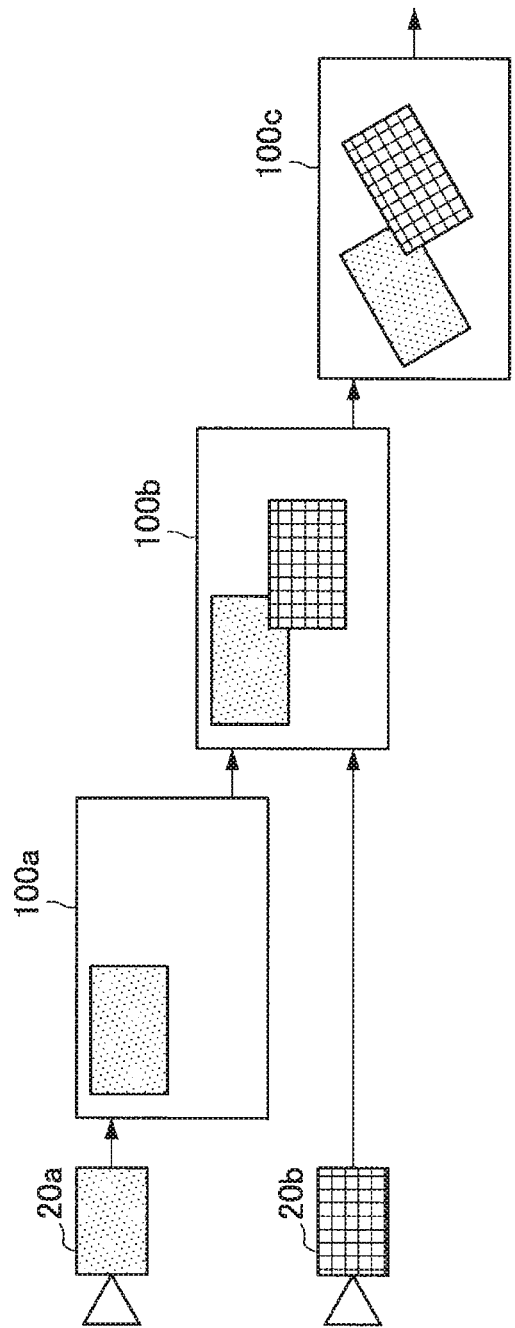
[Fig. 15]

[Fig. 16]
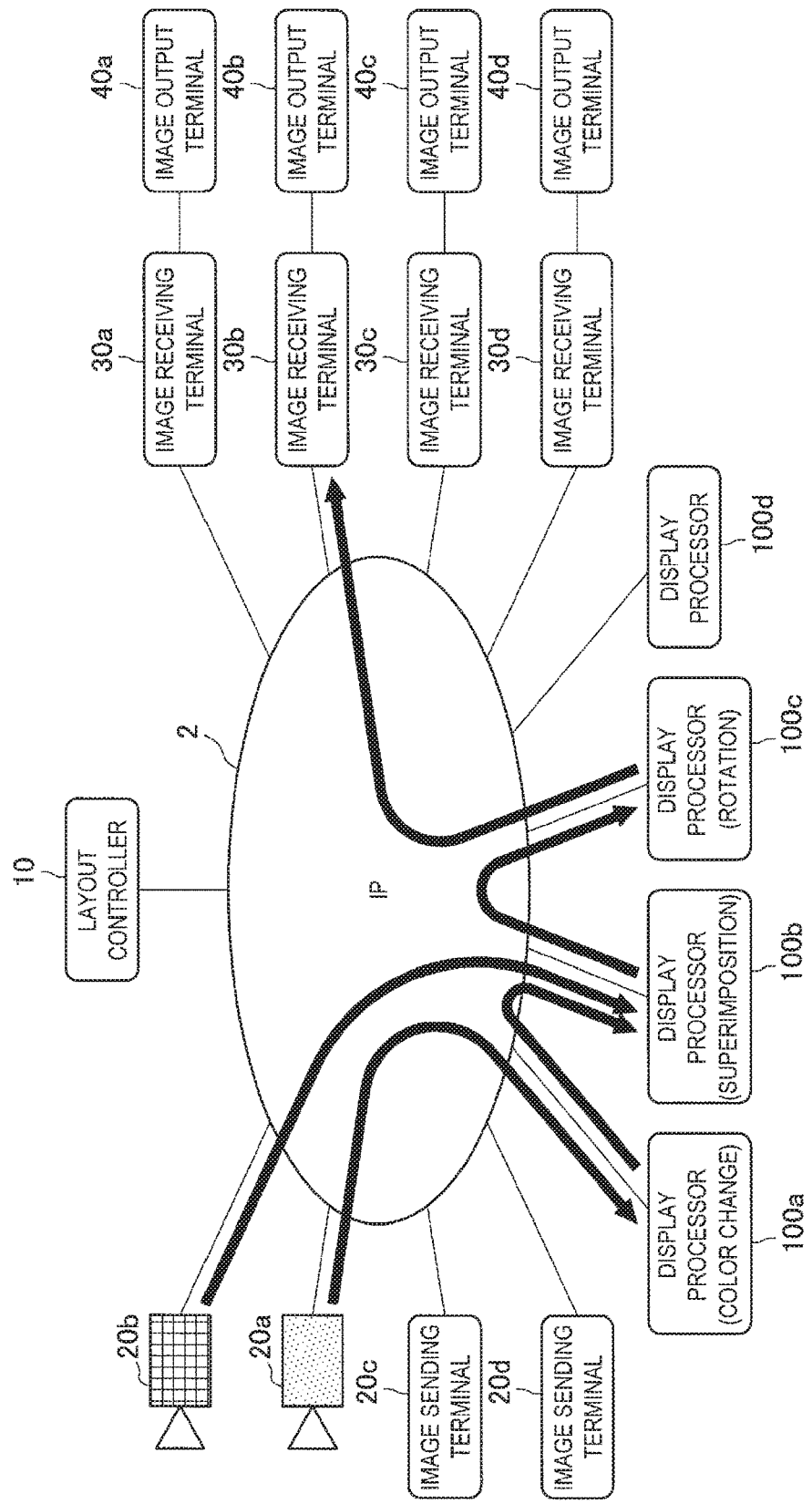

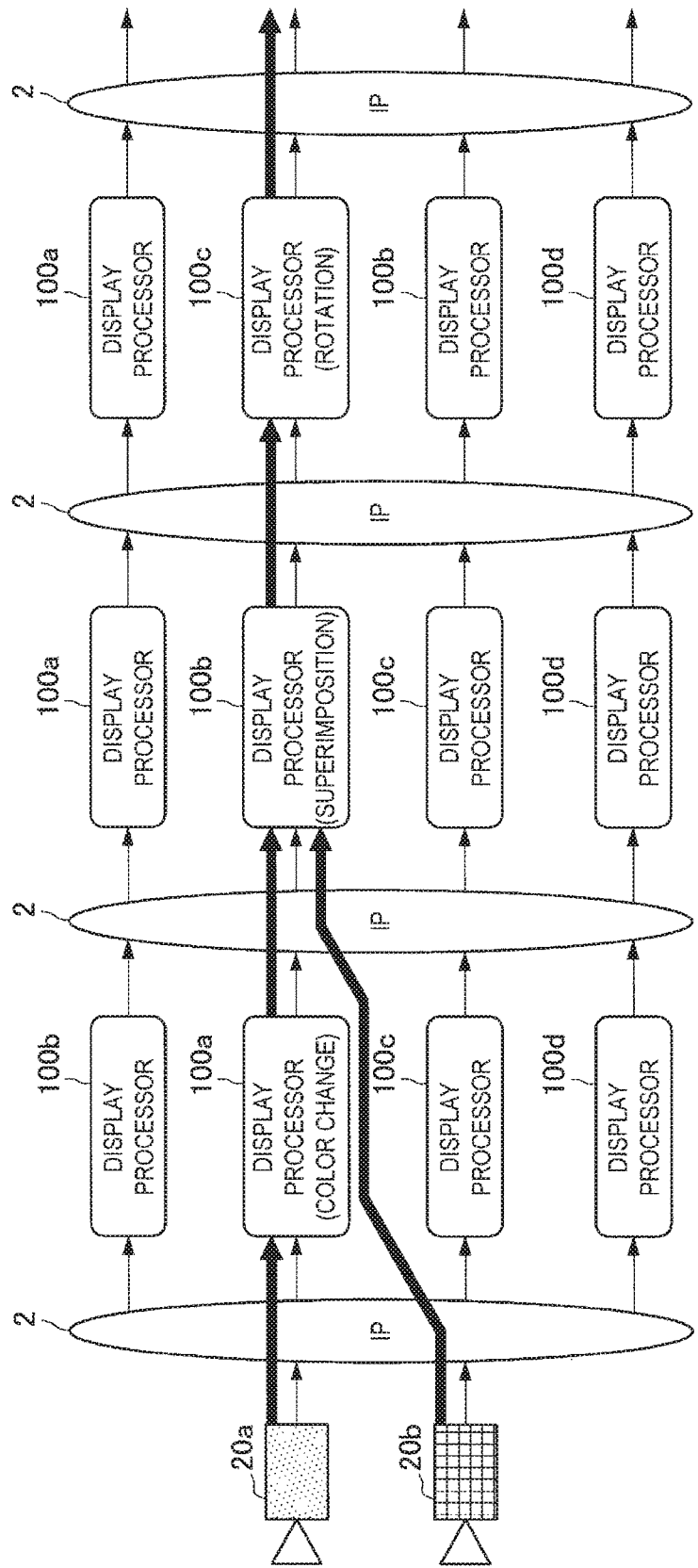
[Fig. 17]

[Fig. 18]
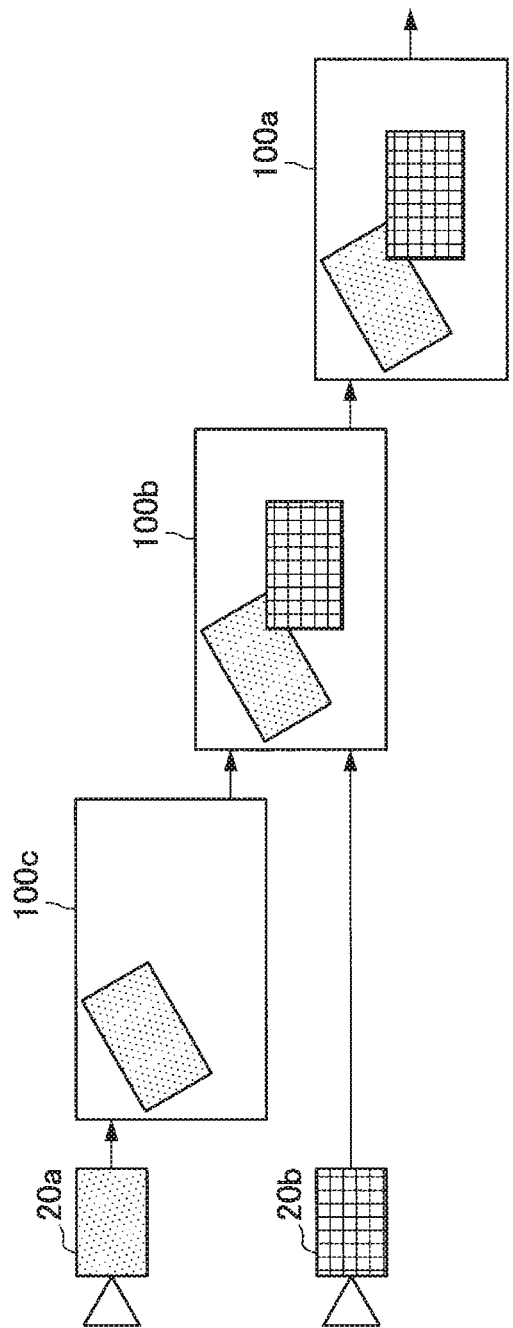

[Fig. 19]
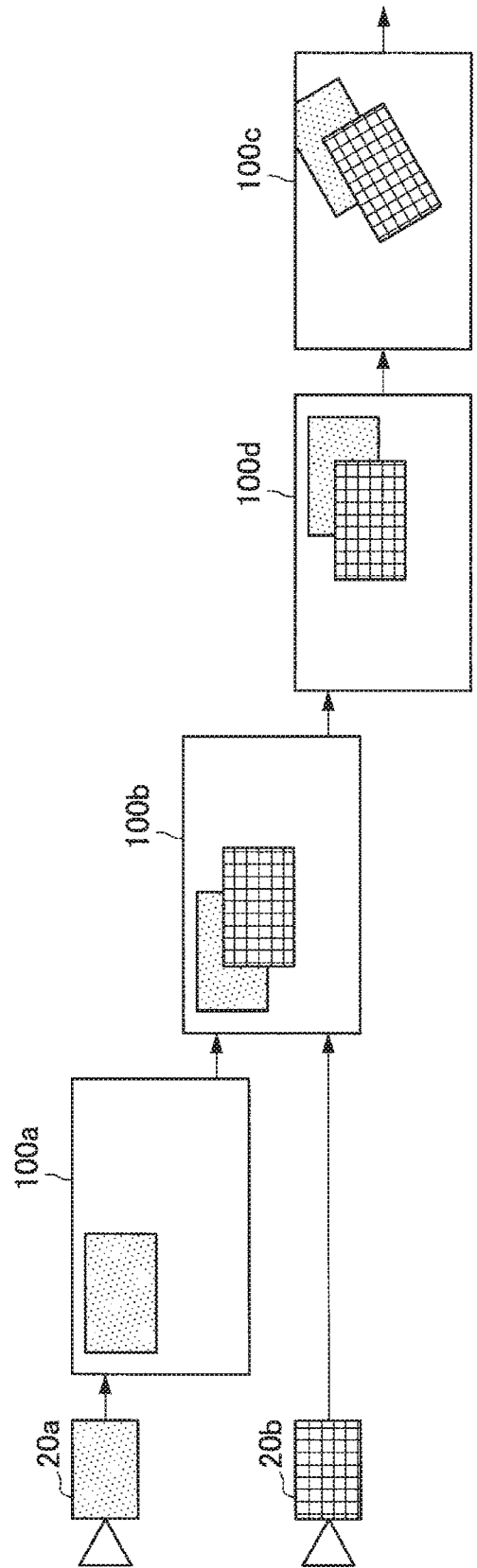

[Fig. 20]
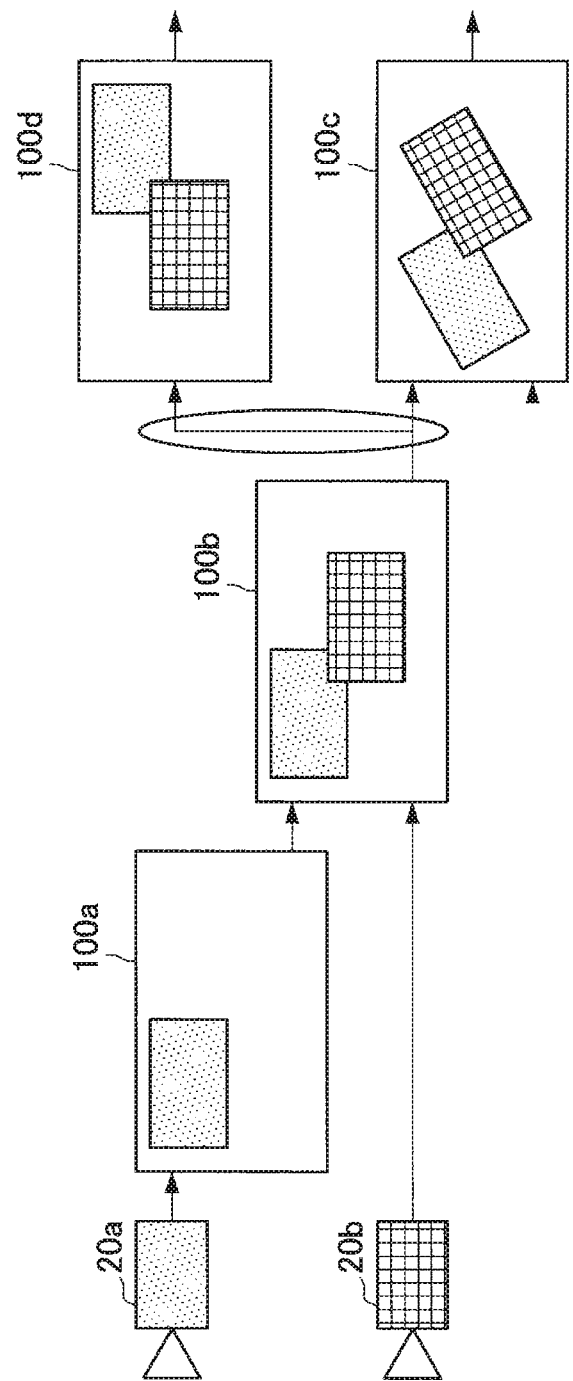

[Fig. 21]
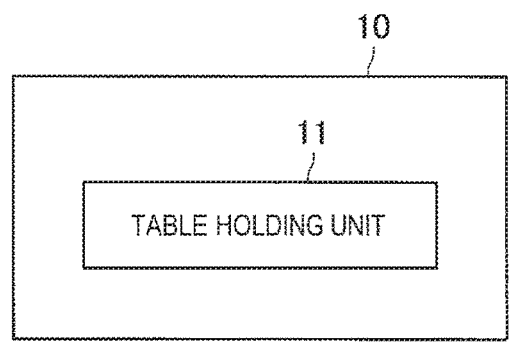
[Fig. 22]
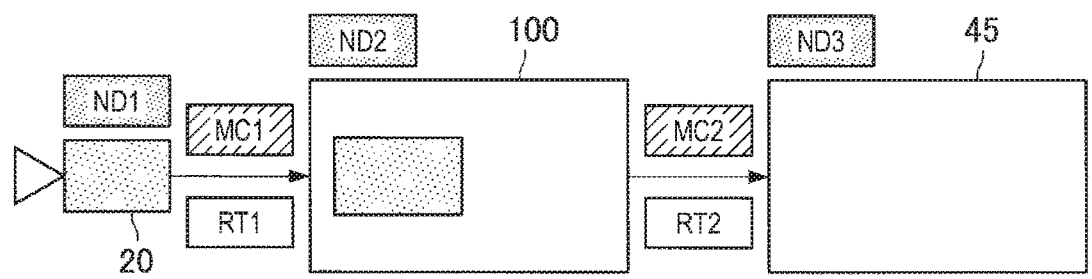
[Fig. 23]
| ID | Multicast Address |
|---|---|
| MC1 | 239.11.12.1 |
| MC2 | 239.11.12.2 |
T1

[Fig. 24]

| ID | Function | Receive Port # | Send Port # | Parameters |
|---|---|---|---|---|
| ND1 | Camera | 0 | 1 | X/Y size, fps, codec, rate, .. |
| ND2 | Display Processor (Color) | 1 | 1 | color space, .. |
| ND3 | Output Display | 1 | 0 | |

| ID | Multicast Address ID | Sender Node ID | Receiver Node ID |
|---|---|---|---|
| RT1 | MC1 | ND1 | ND2 |
| RT2 | MC2 | ND2 | ND3 |

| ID | Multicast Address |
|---|---|
| MC1 | 239.11.12.1 |
| MC2 | 239.11.12.2 |
| MC3 | 239.11.12.3 |
| MC4 | 239.11.12.4 |
| MC5 | 239.11.12.5 |

| ID | Function | Receive Port # | Send Port # | Parameters |
|---|---|---|---|---|
| ND1 | Camera | 0 | 1 | X/Y size, fps, codec, rate, .. |
| ND2 | Camera | 0 | 1 | X/Y size, fps, codec, rate, .. |
| ND3 | Display Processor (Color) | 1 | 1 | color space, .. |
| ND4 | Display Processor (Superimposition) | 2 | 1 | X/Y pos(1,2), pic order, .. |
| ND5 | Display Processor (Rotation) | 1 | 1 | radian, .. |
| ND6 | Output Display | 1 | 0 | |

| ID | Multicast Address ID | Sender Node ID | Receiver Node ID |
|---|---|---|---|
| RT1 | MC1 | ND1 | ND3 |
| RT2 | MC2 | ND3 | ND4(1) |
| RT3 | MC3 | ND2 | ND4(2) |
| RT4 | MC4 | ND4 | ND5 |
| RT5 | MC5 | ND5 | ND6 |

| ID | Multicast Address |
|---|---|
| MC6 | 239.11.12.6 |

[Fig. 30]

| ID | Function | Receive Port # | Send Port # | Parameters |
|---|---|---|---|---|
| ND7 | Display Processor (Invert) | 1 | 1 | Vertical/Horizontal |
| ND8 | Output Display | 1 | 0 | |

| ID | Multicast Address ID | Sender Node ID | Receiver Node ID |
|---|---|---|---|
| RT6 | MC4 | ND4 | ND7 |
| RT7 | MC6 | ND7 | ND8 |

T3'

[Fig. 32]
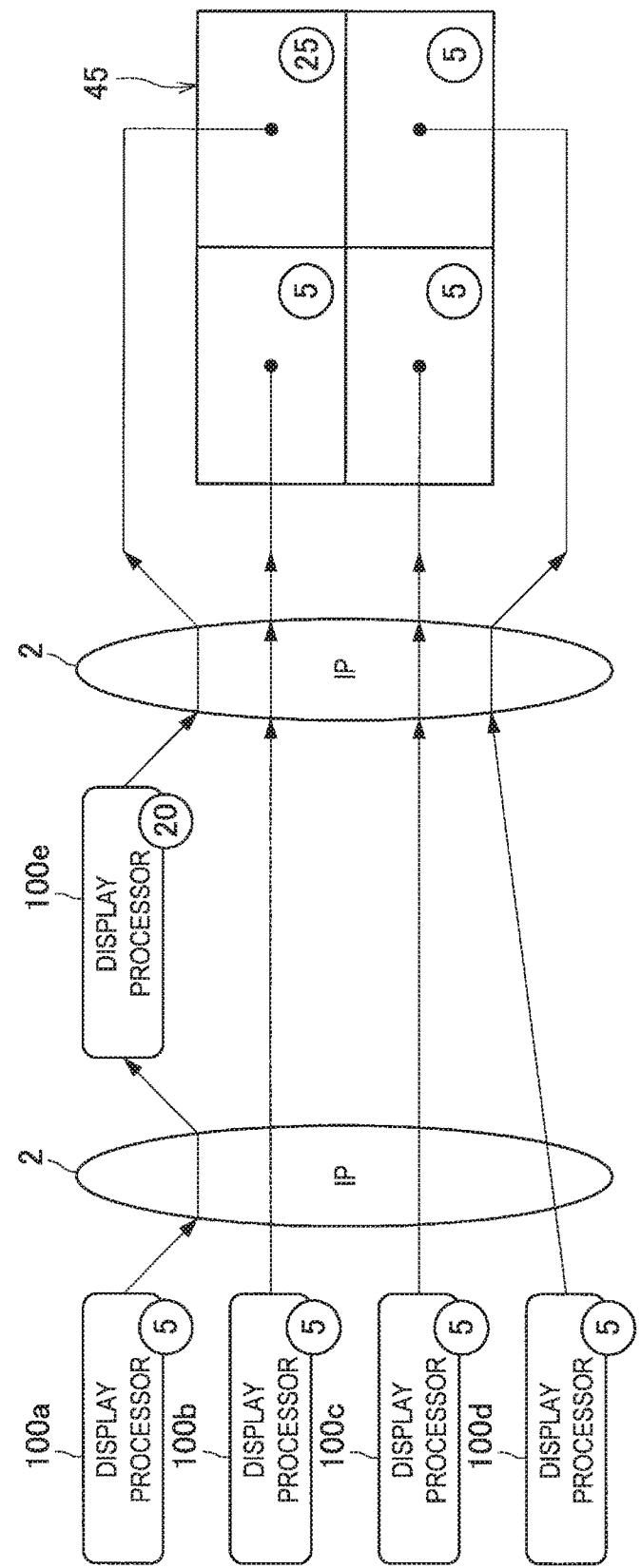

[Fig. 33]
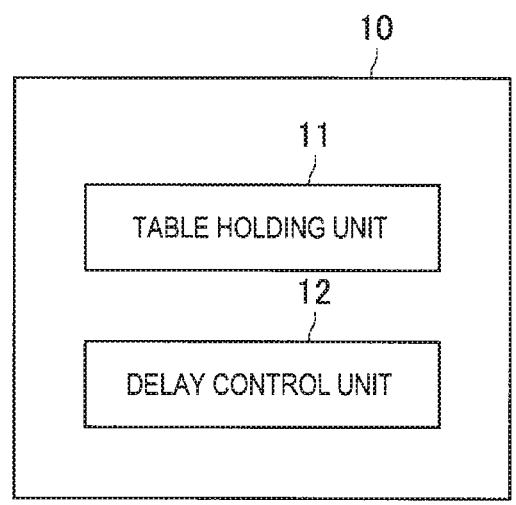

[Fig. 34]
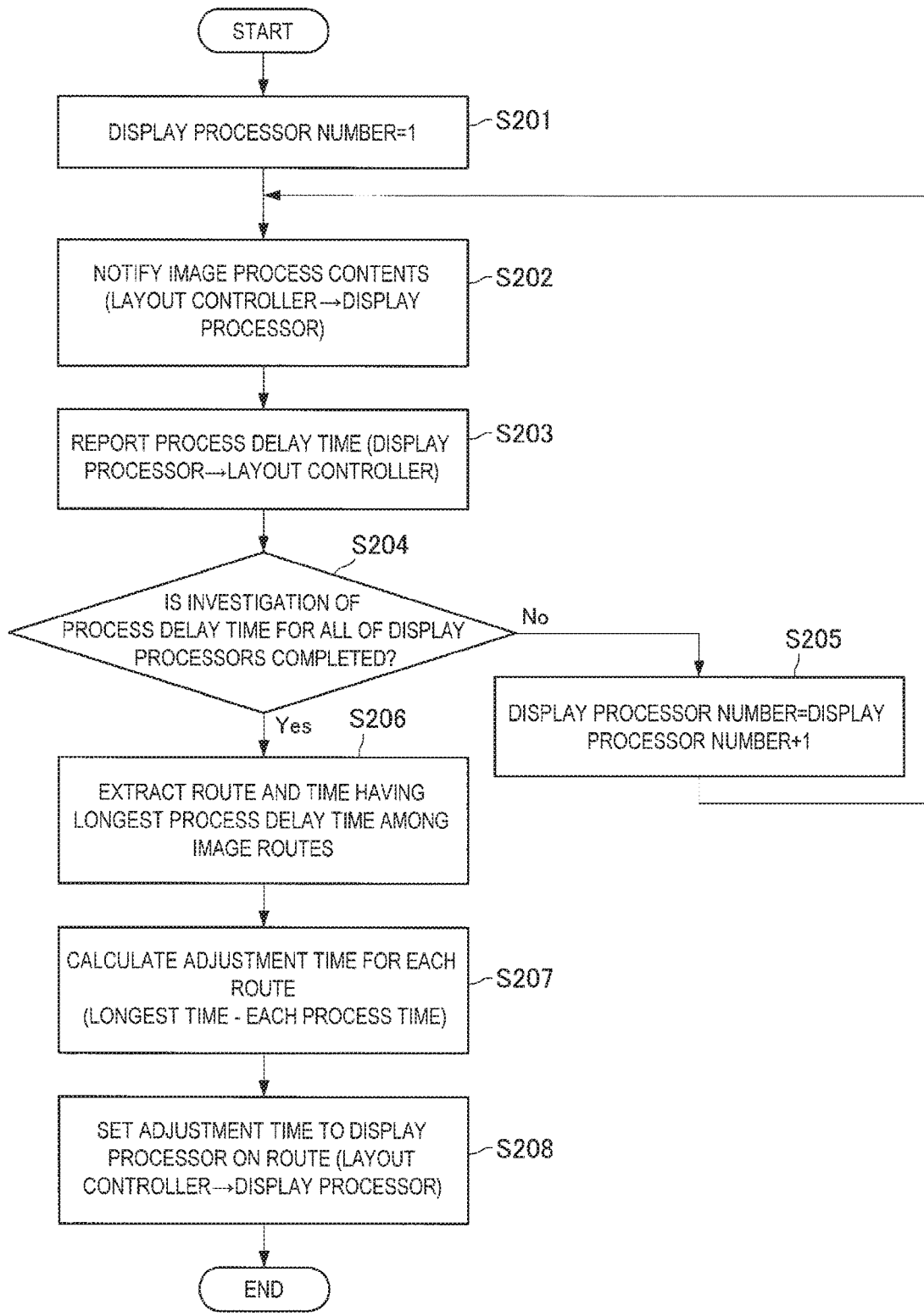

ND DISPLAY OF IMAGE
TRANSMISSION AND DISPLAY OF IMAGE SIGNALS BASED ON MULTICAST TRANSMISSION

CROSS REFERENCE TO RELATED APPLICATIONS

The present disclosure contains subject matter related to that disclosed in Japanese Priority Patent Application JP 2013-121755 filed in the Japan Patent Office on Jun. 10, 2013, the entire content of which is hereby incorporated by reference.

TECHNICAL FIELD

The present disclosure relates to an image transmission system and an image transmission method.

BACKGROUND ART

There is a system for synthesizing images from a plurality of image output devices such as cameras or recorders that output images and displaying a synthesized image. In recent years, there is also a system for connecting together a plurality of image display devices into one display screen to allow such a synthesized image to be displayed on the large display screen (see Patent Literature 1).

CITATION LIST

Patent Literature

[PTL 1]
WO 08/056421

SUMMARY

Technical Problem

In existing techniques, one processor for executing an image process is associated with one image display device on a one-to-one basis. For this reason, a system has little flexibility due to hardware constraints of a processor and thus it is not easy to set a layout in a flexible way or to deal with changes in an image to be displayed.

Therefore, at least one embodiment of the present disclosure provides image transmission with system flexibility, which synthesizes and displays a plurality of images.

Solution to Problem

According to an embodiment of the present disclosure, there is provided an image transmission system including an image control device, and at least two signal processing devices. The signal processing devices each include an image receiver configured to selectively receive one or more images transmitted using multicast based on image control information transmitted from the image control device, one or more image processing units configured to perform an image process on an image received by the image receiver based on the image control information, and an image sender configured to transmit an image subjected to the image process by the image processing unit based on the image control information, the image being transmitted using multicast. The image control device selects a first signal processing device and a second signal processing device from among the at least two signal processing devices and generates the image control information used to cause an image transmitted using multicast from the image sender by the first signal processing device to be received by the image receiver of the second signal processing device.

According to an embodiment of the present disclosure, there is provided an image transmission method including selecting a first signal processing device and a second signal processing device from among at least two signal processing devices, generating image control information used to cause an image transmitted using multicast from the first signal processing device to be received by the second signal processing device, selectively receiving one or more images transmitted using multicast based on the image control information, performing an image process on the selectively received image based on the image control information, and transmitting the image subjected to the image process based on the image control information, the image being transmitted using multicast.

Advantageous Effects of Invention

According to one or more embodiments of the present disclosure described above, it is possible to provide a novel and improved image transmission system and image transmission method, capable of increasing the flexibility of a system which synthesizes and displays a plurality of images.

BRIEF DESCRIPTION OF DRAWINGS

FIG. 1 is an explanatory diagram illustrating an exemplary overall configuration of an image transmission system according to an embodiment of the present disclosure.

FIG. 2A is an explanatory diagram illustrating a general process of the image transmission system 1 according to an embodiment of the present disclosure.

FIG. 2B is an explanatory diagram illustrating a general process of the image transmission system 1 according to an embodiment of the present disclosure.

FIG. 3 is an explanatory diagram illustrating an exemplary user interface displayed on a screen of a layout controller 10.

FIG. 4 is an explanatory diagram illustrating a general process of the image transmission system 1 according to an embodiment of the present disclosure.

FIG. 5 is an explanatory diagram illustrating an exemplary functional configuration of a display processor 100 according to an embodiment of the present disclosure.

FIG. 6 is a flow diagram illustrating an exemplary operation of the image transmission system 1 according to an embodiment of the present disclosure.

FIG. 7 is a flow diagram illustrating an exemplary operation of the image transmission system 1 according to an embodiment of the present disclosure.

FIG. 8 is an explanatory diagram illustrating an example of an image displayed on the image display system 45 based on an exemplary operation of the image transmission system 1 according to an embodiment of the present disclosure.

FIG. 9 is an explanatory diagram illustrating an example of an image displayed on the image display system 45 based on an exemplary operation of the image transmission system 1 according to an embodiment of the present disclosure.

FIG. 10 is an explanatory diagram illustrating an example of an image transmitted based on an exemplary operation of the image transmission system 1 according to an embodiment of the present disclosure.

FIG. 11 is an explanatory diagram illustrating an example of an image transmitted based on an exemplary operation of the image transmission system 1 according to an embodiment of the present disclosure.

FIG. 12 is explanatory diagram illustrating a general process of the image transmission system 1 according to an embodiment of the present disclosure.

FIG. 13 is explanatory diagram illustrating a general process of the image transmission system 1 according to an embodiment of the present disclosure.

FIG. 14 is explanatory diagram illustrating a general process of the image transmission system 1 according to an embodiment of the present disclosure.

FIG. 15 is explanatory diagram illustrating a general process of the image transmission system 1 according to an embodiment of the present disclosure.

FIG. 16 is an explanatory diagram illustrating a process of the image transmission system 1 according to an embodiment of the present disclosure shown in FIG. 15.

FIG. 17 is an explanatory diagram illustrating a process of the image transmission system 1 according to an embodiment of the present disclosure shown in FIG. 15.

FIG. 18 is explanatory diagram illustrating a general process of the image transmission system 1 according to an embodiment of the present disclosure.

FIG. 19 is explanatory diagram illustrating a general process of the image transmission system 1 according to an embodiment of the present disclosure.

FIG. 20 is explanatory diagram illustrating a general process of the image transmission system 1 according to an embodiment of the present disclosure.

FIG. 21 is an explanatory diagram illustrating an exemplary functional configuration of the layout controller 10 according to an embodiment of the present disclosure.

FIG. 22 is an explanatory diagram illustrating an exemplary configuration of the image transmission system 1 according to an embodiment of the present disclosure.

FIG. 23 is an explanatory diagram illustrating an example of a table stored in a table holding unit 11.

FIG. 24 is an explanatory diagram illustrating an example of a table stored in a table holding unit 11.

FIG. 25 is an explanatory diagram illustrating an example of a table stored in a table holding unit 11.

FIG. 26 is an explanatory diagram illustrating an example of a table stored in a table holding unit 11.

FIG. 27 is an explanatory diagram illustrating an example of a table stored in a table holding unit 11.

FIG. 28 is an explanatory diagram illustrating an example of a table stored in a table holding unit 11.

FIG. 29 is an explanatory diagram illustrating an example of a table stored in a table holding unit 11.

FIG. 30 is an explanatory diagram illustrating an example of a table stored in a table holding unit 11.

FIG. 31 is an explanatory diagram illustrating an example of a table stored in a table holding unit 11.

FIG. 32 is an explanatory diagram illustrating an example of a case where the delay times are not coincident with each other for all of the routes from an image sending terminal 20 to an image display system 45.

FIG. 33 is an explanatory diagram illustrating an exemplary functional configuration of a layout controller 10 according to an embodiment of the present disclosure.

FIG. 34 is a flowchart showing an exemplary operation of the layout controller 10 according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
<1. Embodiment of the Present Disclosure>
(Exemplary Overall Configuration of System)
(General Process of System)
(Exemplary Functional Configuration of Display Processor)
(Exemplary Operation of Image Transmission System)
<2. Summary>
<1. Embodiment of the Present Disclosure>
(Exemplary Overall Configuration of System)

An exemplary overall configuration of an image transmission system according to an embodiment of the present disclosure will be described. FIG. 1 is an explanatory diagram illustrating an exemplary overall configuration of the image transmission system 1 according to an embodiment of the present disclosure. An exemplary overall configuration of the image transmission system 1 according to an embodiment of the present disclosure is described below with reference to FIG. 1.

As illustrated in FIG. 1, the image transmission system 1 according to an embodiment of the present disclosure is configured to include a layout controller 10, image sending terminals 20a to 20d, image receiving terminals 30a to 30d, image output terminals 40a to 40d, an image display system 45, and display processors 100a to 100d. The layout controller 10, the image sending terminals 20a to 20d, and the image receiving terminals 30a to 30d are connected to each other via an IP (Internet Protocol) network 2.

The image sending terminals 20a to 20d (hereinafter, sometimes referred simply to as an image sending terminal 20) are terminals for sending an image, such as cameras or recorders. In addition, the image sending terminals 20a to 20d are terminals for transmitting an image using IP multicast distribution.

The image receiving terminals 30a to 30d (hereinafter, sometimes referred simply to as an image receiving terminal 30) are terminals for receiving an image that is transmitted using IP multicast distribution from the image sending terminals 20a to 20d. The image receiving terminals 30a to 30d, when they receive an image, send the received image to the respective image output terminals 40a to 40d.

The image output terminals 40a to 40d (hereinafter, sometimes referred simply to as an image output terminal 40) receive an image from the image receiving terminals 30a to 30d, respectively, and output the image to the video display system 45. The image display system 45 is composed of a plurality of image display devices 50a to 50d, and each of the image display devices 50a to 50d displays a corresponding image outputted from the respective image sending terminals 20a to 20d.

The layout controller 10 determines the way that an image outputted from the image sending terminals 20a to 20d is displayed on the image display system 45. The layout controller 10 grasps the configuration of the image sending terminals 20a to 20d, the image receiving terminals 30a to 30d, and the display processors 100a to 100d, as well as the display shape and size of the image display system 45 composed of the image display devices 50a to 50d. The layout controller 10 instructs appropriately which one of the image sending terminals 20a to 20d to output an image, which one of the display processors 100a to 100d to process the image, and which one of the image receiving terminals 30a to 30d to receive the processed image.

The display processors 100a to 100d (hereinafter, sometimes referred simply to as a display processor 100) perform an image process on an image outputted from the image sending terminals 20a to 20d. The display processors 100a to 100d perform a previously specified image process on an image received based on an instruction from the layout controller 10. The display processors 100a to 100d then distribute the image after being subjected to the image process using IP multicast, based on an instruction from the layout controller 10.

The image transmission system 1 illustrated in FIG. 1 is a system in which the display processors 100a to 100d perform the image process on the image distributed using IP multicast from the image sending terminals 20a to 20d and re-distribute the processed image using IP multicast. In addition, the image transmission system 1 illustrated in FIG. 1 is a system in which the image receiving terminals 30a to 30d receive the image distributed using IP multicast from the display processors 100a to 100d and deliver the received image to the image output terminals 40a to 40d, and then the image display device 50 displays the image.

Thus, in the image transmission system 1 illustrated in FIG. 1, the image sending terminals 20a to 20d simply distribute an image to the IP network 2 using IP multicast based on predetermined settings or based on an instruction from the layout controller 10, rather than outputting the image to a particular image display device. In addition, the display processors 100a to 100d receive a specified image from among images that are transmitted from the image sending terminals 20a to 20d and perform an image process on the specified image. After the display processors 100a to 100d perform the image process, they distribute the processed image to the IP network 2 using IP multicast based on predetermined settings or based on an instruction from the layout controller 10. The image receiving terminals 30a to 30d receive the specified image and send it to the image output terminals 40a to 40d.

FIG. 1 illustrates the configuration in which four image sending terminals 20a to 20d, four image receiving terminals 30a to 30d, and four display processors 100a to 100d are connected to the IP network 2, but the present disclosure is not limited to this example. In an embodiment of the present disclosure, an image is transmitted via the IP network 2 using IP multicast distribution, and thus this makes it possible to increase the availability and scalability of a system which synthesizes and displays a plurality of images.

Moreover, in FIG. 1, the image receiving terminals 30a to 30d are illustrated as being terminals different from the image output terminals 40a to 40d, but the present disclosure is not limited to this example. A terminal for receiving an image distributed using IP multicast may be integrated with a terminal for outputting an image to the image display system 45.

An exemplary overall configuration of the image transmission system 1 according to an embodiment of the present disclosure is described above with reference to FIG. 1. A general process of the image transmission system 1 according to an embodiment of the present disclosure will be described.

(General Process of System)

FIGS. 2A and 2B are explanatory diagrams illustrating a general process of the image transmission system 1 according to an embodiment of the present disclosure. FIGS. 2A and 2B illustrate an example of the flow of an image in the image transmission system 1 in the case of the image transmission system 1 having the configuration as illustrated in FIG. 1. A general process of the image transmission system 1 according to an embodiment of the present disclosure will be described below with reference to FIGS. 2A and 2B.

The image which is transmitted from the image sending terminals 20a to 20d is distributed to the IP network 2 using IP multicast based on predetermined settings or an instruction from the layout controller 10. The layout controller 10 sends a control signal to the respective corresponding display processors 100a to 100d in accordance with the layout determined by the layout controller 10. This control signal is transmitted from the layout controller 10 to the respective corresponding display processors 100a to 100d through the IP network 2.

The control signal which is transmitted from the layout controller 10 may include information on the image sending terminal, information on an image position, time information (information of image switching timing), and information on the image receiving terminal.

The Information on the image sending terminal may include connection destination information (multicast address and port number) and codec information. The information on an image position may include the display shape and size of the image display system 45, information about the position, size, display angle, superimposition, or the like of an image displayed on the image display system 45, and information on the number of displays to be managed by the image display system 45. The information on the image receiving terminal may include output destination information (multicast address and port number) and codec information.

FIG. 3 is an explanatory diagram illustrating an example of a user interface that is displayed on a screen of the layout controller 10. A list of images that are transmitted from the image sending terminals 20a to 20d and the display position of each image displayed on the image display system 45 are shown on the user interface v10 illustrated in FIG. 3. The user of the layout controller 10 can determine an image to be displayed and a position at which the image is displayed, by means of the user interface v10 illustrated in FIG. 3. FIG. 3 illustrates an example of a case where an image is displayed on the image display system 45 in which six screens in the horizontal direction and four screens in the vertical direction are arranged in a matrix form.

The display processors 100a to 100d receive selectively an image transmitted using IP multicast distribution from the image sending terminals 20a to 20d and perform a predetermined image process on the received image based on the control signal.

When the display processors 100a to 100d perform the image process, each of them distributes the image after being subjected to the image process using IP multicast to the IP network 2 based on an instruction from the layout controller 10. The image receiving terminals 30a to 30d receive selectively the image distributed using IP multicast from the display processors 100a to 100d based on an instruction from the layout controller 10. Each of the image receiving terminals 30a to 30d sends the received image to the image output terminals 40a to 40d. Each of the image output terminals 40a to 40d outputs the image transmitted from the image receiving terminals 30a to 30d to the image display system 45 which is composed of the image display devices 50a to 50d.

The image transmission system 1 according to an embodiment of the present disclosure transmits an image as shown in FIGS. 2A and 2B, and thus this makes it possible to increase the availability and scalability of a system which synthesizes and displays a plurality of images.

FIG. 4 is an explanatory diagram illustrating a general process of the image transmission system 1 according to an embodiment of the present disclosure. FIG. 4 illustrates an example of a case where an image distributed using IP multicast from five display processors 100a to 100e is displayed on the image display system 45.

In the image transmission system 1 according to an embodiment of the present disclosure, the display processors 100a to 100e, which are provided independently of each other, generate an image to be displayed on a corresponding portion of display areas in the image display system 45 and distribute the generated image using IP multicast.

In the example illustrated in FIG. 4, the display processor 100a generates an image to be displayed on an area A among display areas of the image display system 45. The display processor 100b generates an image to be displayed on an area B among the display areas of the image display system 45. The display processor 100c generates an image to be displayed on an area C among the display areas of the image display system 45. The display processor 100d generates an image to be displayed on an area D among the display areas of the image display system 45. The display processor 100e generates an image to be displayed on an area E among the display areas of the image display system 45. Thus, each of the display processors 100a to 100e includes a frame buffer for each of the respective areas assigned to the display processors.

The display processors 100a to 100e according to an embodiment of the present disclosure are configured to selectively receive an image, perform an image process on the received image, and distribute the image after being subjected to the image process using IP multicast, based on an instruction from the layout controller 10, when a plurality of images are synthesized and displayed on the image display system 45.

A general process of the image transmission system 1 according to an embodiment of the present disclosure is described above. An exemplary functional configuration of the display processors 100a to 100d (hereinafter, sometimes referred simply to as a display processor 100) according to an embodiment of the present disclosure will be described.

(Exemplary Functional Configuration of Display Processor)

FIG. 5 is an explanatory diagram illustrating an exemplary functional configuration of the display processor 100 according to an embodiment of the present disclosure. Referring to FIG. 5, an exemplary functional configuration of the display processor 100 according to an embodiment of the present disclosure will be described.

As illustrated in FIG. 5, the display processor 100 is configured to include a control signal control unit 102, a multicast reception control unit 104, an image editing management unit 106, a multicast transmission control unit 108, an image receiver 110, decoders 112a to 112d, image editing processing units 114a and 114b, encoders 116a and 116b, and an image sender 118.

The control signal control unit 102 acquires a control signal that is transmitted from the layout controller 10. The control signal control unit 102 then controls the operation of the multicast reception control unit 104, the image editing management unit 106, the multicast transmission control unit 108, and decoders 112a to 112d, based on the acquired control signal.

The multicast reception control unit 104 controls the image receiver 110 to receive an image specified by the control signal from among the images distributed using IP multicast to the IP network 2, based on the control of the control signal control unit 102.

The image editing management unit 106 manages the image editing processing units 114a and 114b based on the control of the control signal control unit 102. More specifically, the image editing management unit 106 instructs the image editing processing units 114a and 114b to perform an editing process of the contents specified by the control signal based on the control of the control signal control unit 102. For example, the image editing management unit 106 instructs the image editing processing units 114a and 114b to perform the editing process such as segmentation, zooming, and positioning of an image received by the image receiver 110.

The multicast transmission control unit 108 controls the image sender 118 to distribute an image to the IP network 2 using IP multicast based on the control of the control signal control unit 102.

The image receiver 110 receives an image (encoded image) being distributed using IP multicast to the IP network 2. Specifically, the image receiver 110 selectively receives an image specified by the multicast reception control unit 104 from among images being distributed using IP multicast to the IP network 2. Although FIG. 5 illustrates the image receiver 110 capable of simultaneously receiving four or more images, the present disclosure is not limited to this example. The number of images that can be received simultaneously by the image receiver 110 may be dependent on bandwidth of the IP network 2, bandwidth of an image to be received, the number of decoders provided in the display processor 100, or the like. The image receiver 110, when it receives an image specified by the multicast reception control unit 104, sends the received image to the decoders 112a to 112d.

The decoders 112a to 112d decode the encoded image that is received by the image receiver 110. When the decoders 112a to 112d decode the encoded image, they output the decoded image to the image editing processing units 114a and 114b. The decoders 112a to 112d determine their respective destinations to which the images are outputted, based on predetermined settings or the control of the control signal control unit 102.

The image editing processing units 114a and 114b perform an image editing process on an image outputted from the decoders 112a to 112d, based on the instruction from the image editing management unit 106. The image editing process performed by the image editing processing units 114a and 114b may include segmentation, zooming, positioning, or the like of the image outputted from the decoders 112a to 112d. The image editing processing units 114a and 114b, when they perform the image editing process on the image, output the edited image to the encoders 116a and 116b, respectively.

The encoders 116a and 116b encode an image outputted respectively from the image editing processing units 114a and 114b. The encoders 116a and 116b output the encoded image to the image sender 118, based on predetermined settings or the control of the control signal control unit 102.

The image sender 118 sends the image encoded by the encoders 116a and 116b to the IP network 2 using IP multicast distribution, based on the control of the multicast transmission control unit 108. Although FIG. 5 illustrates the image sender 118 that sends two or more images using IP multicast distribution, the present disclosure is not limited to this example.

An exemplary functional configuration of the display processor 100 according to an embodiment of the present disclosure is described above with reference to FIG. 5. An exemplary operation of the image transmission system 1 according to an embodiment of the present disclosure will be described.

(Exemplary Operation of Image Transmission System)

FIG. 6 is a flow diagram showing an exemplary operation of the image transmission system 1 according to an embodiment of the present disclosure. The flow diagram shown in FIG. 6 illustrates the flow from when a layout of an image to be displayed on the image display system 45 is determined by the layout controller 10 to when the image is displayed on the image display system 45, as a sequence diagram. An exemplary operation of the image transmission system 1 according to an embodiment of the present disclosure will be described with reference to FIG. 6.

The layout controller 10 makes a request for the start of transmission of an image to the image sending terminal 20 (step S101). The image sending terminal 20 distributes the image using multicast to a transmission destination (multicast addresses) that is specified by the layout controller 10 or specified previously (step S102).

Subsequently, when the layout controller 10 determines the layout of an image displayed on the image display system 45 based on a user's operation through the user interface as shown in FIG. 3 (step S103), the layout controller 10 sends a request to the display processor 100 based on the determined layout (step S104). This request is intended that the display processor 100 selectively receives the image distributed using multicast from the image sending terminal 20, performs the image process on the received image, and re-sends the processed image. This request in step S104 is made by allowing the layout controller 10 to send a control signal to the display processor 100.

The display processor 100, when it receives the request from the layout controller 10, receives an image specified to be received from among images distributed using multicast from the image sending terminal 20 based on the request from the layout controller 10 (step S105). As described above, the control signal includes information on a connection destination such as multicast addresses and port numbers as information of the image sending terminal. The display processor 100 can select an image to be received from among images flowing through the IP network 2 based on the information on the connection destination such as multicast addresses and port numbers.

The display processor 100, when it receives the image in step S105, performs an image process on the received image. The image process performed by the display processor 100 may include segmentation, zooming, positioning, or the like of the image as described above. Then, the display processor 100, when it performs the image process on the received image, distributes the image using multicast to the transmission destination (multicast address) that is specified by the layout controller 10 or specified previously (step S106).

The layout controller 10 makes a request to the image receiving terminal 30 for the start of reception of the image which is distributed using multicast to the IP network 2 by the display processor 100 based on the determined layout (step S107).

The image receiving terminal 30 selectively receives an image to be received from among the images being distributed using multicast to the IP network 2 based on the request from the layout controller 10 (step S108). The image receiving terminal 30 outputs the received image to the image output terminal 40 (step S109). The image output terminal 40 outputs the image outputted from the image receiving terminal 30 to the respective corresponding image display devices of the image display system 45.

The image transmission system 1 according to an embodiment of the present disclosure performs the operation as described above, and thus this makes it possible to display the images distributed using IP multicast to the IP network 2 by the image sending terminal 20 on the image display system 45, based on the layout of images determined by the layout controller 10.

The layout controller 10 can change the layout of images to be displayed on the image display system 45 while the images are displayed on the display system 45. Subsequently, there will be described an exemplary operation of the image transmission system 1 according to an embodiment of the present disclosure in the case where the layout controller 10 changes the layout of images to be displayed on the image display system 45 while the images are displayed on the image display system 45.

FIG. 7 is a flow diagram showing an exemplary operation of the image transmission system 1 according to an embodiment of the present disclosure. The flow diagram shown in FIG. 7 illustrates the flow in the case where the layout controller 10 changes the layout of images to be displayed on the image display system 45 while the images are displayed on the image display system 45, as a sequence diagram. Referring now to FIG. 7, there will be described an exemplary operation of the image transmission system 1 according to an embodiment of the present disclosure.

The image sending terminal 20 distributes an image using multicast to the transmission destination (multicast address) that is specified by the layout controller 10 or specified previously (step S111). In this state, when the layout controller 10 changes the layout of images displayed on the image display system 45 based on the user's operation through the user interface as shown in FIG. 3 (step S112), the layout controller 10 sends a request to the display processor 100 based on the determined layout (step S113). This request is intended that the display processor 100 selectively receives the image distributed using multicast from the image sending terminal 20, performs the image process on the received image, and re-sends the processed image. This request in step S113 is made by allowing the layout controller 10 to send a control signal to the display processor 100.

The layout controller 10 acquires a layout change event and performs a layout change process by setting a frame as the minimum value.

The display processor 100, when it receives the request from the layout controller 10, receives an image specified to be received according to changes in the layout from among images distributed using multicast from the image sending terminal 20 based on the request from the layout controller 10. In addition, the display processor 100 terminates the reception of an image that is unnecessary according to changes in the layout based on the request from the layout controller 10 (step S114).

The display processor 100, when it performs the image process on the received image, distributes the image using multicast to the transmission destination (multicast address) that is specified by the layout controller 10 or specified previously (step S115).

The layout controller 10 makes a request to the image receiving terminal 30 for the start of reception of the image distributed using multicast to the IP network 2 by the display processor 100 based on the determined layout (step S116).

The image receiving terminal 30 selectively receives an image to be received from among the images distributed using multicast to the IP network 2 based on the request from the layout controller 10 (step S117). The image receiving terminal 30 outputs the received image to the image output terminal 40 (step S118). The image output terminal 40 outputs the image outputted from the image receiving terminal 30 to the respective corresponding image display devices of the image display system 45.

The image transmission system 1 according to an embodiment of the present disclosure performs the operation as described above, and thus this makes it possible to display the images distributed using IP multicast to the IP network 2 by the image sending terminal 20 on the image display system 45 in a state where the image is displayed on the image display system 45 based on the layout of images changed by the layout controller 10.

An exemplary operation of the image transmission system 1 according to an embodiment of the present disclosure is described above. An image to be displayed on the image display system 45 will be described in more detail based on an exemplary operation of the image transmission system 1 according to an embodiment of the present disclosure described above.

FIG. 8 is an explanatory diagram illustrating an example of an image displayed on the image display system 45 based on an exemplary operation of the image transmission system 1 according to an embodiment of the present disclosure. FIG. 8 illustrates a case where images transmitted from three image sending terminals 20*a* to 20*c* are displayed on the image display system 45 composed of sixteen displays arranged in a matrix of four rows and four columns The image sending terminals 20*a* to 20*c* are respectively illustrated in FIG. 8 as a television camera. In addition, four display processors 100*a* to 100*d* are also illustrated in FIG. 8.

It is assumed that, among the displays of the image display system 45, the display processor 100*a* is assigned previously to four displays at the upper left corner (area A in FIG. 8), the display processor 100*b* is assigned previously to four displays at the upper right corner (area B in FIG. 8), the display processor 100*c* is assigned previously to four displays at the lower left corner (area C in FIG. 8), and the display processor 100*d* is assigned previously to four displays at the lower right corner (area D in FIG. 8). These display processors are assigned previously to be in charge of their respective image process. Accordingly, each of the display processors 100*a* to 100*d* is configured to be able to simultaneously output four images.

It is considered the case where images outputted from the image sending terminal 20*a*, the image sending terminal 20*b*, and the image sending terminal 20*c* are displayed on the area A, the area B, and the area C, respectively, and this is determined by the layout controller 10. The display processor 100*a* is in charge of the image process in the area A, and thus the layout controller 10 instructs the display processor 100*a* to receive the image distributed using IP multicast from the image sending terminal 20*a*. Similarly, the display processor 100*b* is in charge of the image process in the area B, and thus the layout controller 10 instructs the display processor 100*b* to receive the image distributed using IP multicast from the image sending terminal 20*b*. In addition, similarly, the display processor 100*c* is in charge of the image process in the area C, and thus the layout controller 10 instructs the display processor 100*c* to receive the image distributed using IP multicast from the image sending terminal 20*c*. Meanwhile, nothing is displayed on the area D, and thus the layout controller 10 does not instruct the display processor 100*d* to receive an image.

The display processor 100*a*, when it receives the image distributed using IP multicast from the image sending terminal 20*a*, performs the image process such as segmentation or enlargement on the received image so that the received image is displayed on four displays in the area A of the image display system 45. Similarly, the display processors 100*b* and 100*c* receive an image distributed using IP multicast from the image sending terminals 20*b* and 20*c*, respectively, and perform the image process such as segmentation or enlargement on the received image. In addition, the display processors 100*a* to 100*c* update the position of the image in units of pixels in each vertical scanning period V.

The display processors 100*a* to 100*c* send a multicast IGMP (Internet Group Management Protocol) Join message to a specified multicast address from the information on the image sending terminals, which is included in the control signal received from the layout controller 10, and start the reception of an image. The image to be received becomes a source of an image displayed on each area managed by the respective display processors 100*a* to 100*c*.

Subsequently, the display processors 100*a* to 100*c* acquire how to arrange an image in an area where each of the display processors is in charge of displaying an image, from image position information included in the control signal received from the layout controller 10. In the example shown in FIG. 8, the display processors 100*a* to 100*c* determine that all of the received images are used rather than segmenting some of them, because all of the images are included in the areas where the display processors 100*a* to 100*c* are in charge of displaying the images.

In the example shown in FIG. 8, each of the display processors 100*a* to 100*c* is in charge of four displays. In other words, each of the display processors 100*a* to 100*c* is in charge of processing of the display images in four image receiving terminals 30 and four image output terminals 40. Thus, each of the display processors 100*a* to 100*c* calculates how to arrange the received image in the four displays according to a parameter acquired from the image position information, generates an image to be transmitted to the respective image output terminals 40, and re-sends the generated image to the specified multicast address. The image receiving terminal 30 performs a reception process on the image addressed to the multicast address which is specified from the layout controller 10 or is set previously, and provides the received image to the image output terminal 40 for displaying.

In this way, the image outputted from each of the display processors 100*a* to 100*c* is received by the image receiving terminal 30 based on an instruction of the layout controller 10 and is displayed on the image display system 45. The image display system 45 can display an image in accordance with the layout specified by the layout controller 10 by simply allowing the respective displays to output the image.

FIG. 9 is an explanatory diagram illustrating another example of the image displayed on the image display system 45 based on the exemplary operation of the image transmission system 1 according to an embodiment of the present disclosure. FIG. 9 illustrates a case where an image transmitted from one image sending terminal 20*a* is displayed on the image display system 45 composed of 16 displays that are arranged in a matrix of four rows and four columns. The image sending terminal 20*a* is illustrated in FIG. 9 as a television camera. In addition, four display processors 100*a* to 100*d* are also illustrated in FIG. 9. It is assumed that the displays in which the display processors 100*a* to 100*d* are in charge of the image process are the same as those shown in FIG. 8.

It is considered a case where the layout controller 10 determines to allow images outputted from the image sending terminal 20 to be displayed on the areas A to D. The layout controller 10 instructs all of the display processors 100a through 100d to receive an image distributed using IP multicast from the image sending terminal 20.

The display processor 100a, when it receives an image distributed using IP multicast from the image sending terminal 20a based on the instruction of the layout controller 10, performs the image process such as segmentation or enlargement on the received image to be displayed on each of the four displays of the area A in the image display system 45. Similarly, each of the display processors 100b, 100c, and 100d also receives an image distributed using IP multicast from the image sending terminal 20a and performs the image process such as segmentation or enlargement on the received image.

The example shown in FIG. 9 is the case where images are displayed across a plurality of areas as well as areas of which the display processors 100a to 100d are in charge. In a similar way to the example shown in FIG. 8, the display processors 100a to 100d send a multicast IGMP Join message to a specified multicast address from the information on the image sending terminals, which is included in the control signal received from the layout controller 10, and start the reception of an image.

Subsequently, each of the display processors 100a to 100d acquires how to arrange an image in an area where each of them is in charge of displaying, from image position information included in the control signal received from the layout controller 10. In the example shown in FIG. 9, the display processors 100a to 100d determine that a segmentation process is performed on some of the received images, because some of the images are enlarged and used in the areas where the display processors 100a to 100d are in charge of displaying.

The display processors 100a to 100d may perform, for example, two kinds of procedures when they perform the segmentation process on an image. One of both is that the display processors 100a to 100d themselves perform the process by grasping the position of which the display processors 100a to 100d take charge for the entire display of the image display system 45. For example, when the coordinates of the entire display in the image display system 45 range from (0, 0) to (x, y), it is necessary for the display processors 100a to 100d to grasp in advance a range of which each of them is in charge among the coordinate ranges. When this method is employed, the display processors 100a to 100d acquire the shape and size of the entire display of the image display system 45 from the image position information, and calculate a position of the display image corresponding to the coordinates of the entire display of the image display system 45. Then, the display processors 100a to 100d identify the area at which they are in charge of displaying, and perform the segmentation process, if necessary, on an image to be displayed on the area at which they are in charge of displaying.

The other method is that the layout controller 10 performs calculation of the area at which the respective display processors 100a to 100d are in charge of displaying an image on the entire display of the image display system 45. For example, when the coordinates of the entire display in the image display system 45 range from (0, 0) to (x, y), it is necessary for the layout controller 10 to grasp in advance a range of which each of the display processors 100a to 100d is in charge among the coordinate ranges. When this method is employed, the layout processor 10 causes the image position information to contain information on image display areas together with the display position. The display processors 100a to 100d perform the image segmentation process based on the information on image display areas transmitted from the layout controller 10.

Also in the example shown in FIG. 9, each of the display processors 100a to 100d is in charge of four displays. In other words, each of the display processors 100a to 100d is in charge of processing an image to be displayed in four image receiving terminals 30 and four image output terminals 40. Accordingly, each of the display processors 100a to 100d calculates how to arrange the received image in each of the four displays in accordance with a parameter acquired from the image position information, generates an image to be transmitted to the respective image output terminals 40, and re-sends the generated image to the specified multicast address. The image receiving terminal 30 performs the reception process on the image addressed to the multicast address which is specified from the layout controller 10 or is set previously, and provides the received image to the image output terminal 40 for displaying it.

The display processors 100a to 100d distribute the image subjected to the image process using IP multicast as described above. The image outputted from the display processors 100a to 100d are received by the image receiving terminal 30 and are displayed on the image display system 45, based on the instruction of the layout controller 10. The image display system 45 can display an image in accordance with the layout specified by the layout controller 10 by simply allowing the respective displays to output the image.

In the two examples described above, there is illustrated an example in which the display processor 100 receives only an image from one image sending terminal 20 and performs the image process on the received image, but the present disclosure is not limited to this example. The display processor 100 may receive simultaneously images from the image sending terminal 20 and may perform the image process in units of images. In addition, the display processor 100 may perform a superimposition process (image superimposition process according to the superimposed order that is specified or set previously) of the received image. Furthermore, the display processor 100 may perform a rotation process of the received image.

In this way, the image transmission system 1 according to an embodiment of the present disclosure allows an image outputted from the image sending terminal 20 to be displayed on the image display system 45 in accordance with the layout specified by the layout controller 10. However, when the display processor 100 outputs an image, if there is a gap in the output timing of the image, it is difficult to display properly the image on the image display system 45. Thus, the display processor 100 outputs an image in synchronization with another display processor 100.

FIGS. 10 and 11 are explanatory diagrams illustrating an example of an image transmitted based on the exemplary operation of the image transmission system 1 according to an embodiment of the present disclosure. FIGS. 10 and 11 illustrate three image sending terminals 20a to 20c and four display processors 100a to 100d. In the example illustrated in FIGS. 10 and 11, an image outputted from the image sending terminal 20a is instructed to be received by the display processors 100a to 100d, an image outputted from the image sending terminal 20b is instructed to be received by the display processors 100c and 100d, and an image outputted from the image sending terminal 20c is instructed to be received by the display processor 100d. In addition, each of the display processors 100a to 100d is configured to be able to output simultaneously four images in a similar way to the example shown in FIGS. 8 and 9.

When the transmission and reception of an image are performed as shown in FIG. 10, each of the display processors 100*a* to 100*d* outputs an image in synchronization with other display processors 100*a* to 100*d*.

Each of the display processors 100*a* to 100*d* receives an image outputted from the image sending terminals 20*a* to 20*c*, but its reception timing may be changed constantly depending on the condition of the IP network 2. FIG. 11 illustrates an example of the reception timing of the image received by the respective display processors 100*a* to 100*d*.

The display processors 100*a* to 100*d* output an image in synchronization with House Sync (a synchronization signal serving as a reference). The display processors 100*a* to 100*d* can synchronize the output timing of an image with other display processors 100*a* to 100*d* by outputting an image in synchronization with House Sync.

In this way, in the image transmission system 1 according to an embodiment of the present disclosure, an image is distributed using multicast via the IP network 2, and thus the plurality of image receiving terminals 30 can receive simultaneously the image. Accordingly, the image transmission system 1 according to an embodiment of the present disclosure can display an image on the plurality of image display system 45 in the same way in accordance with the layout determined by the layout controller 10.

In the example described above, the layout controller 10 controls the image receiving terminal 30 to receive an image distributed using multicast from the display processor 100, but the present disclosure is not limited to the example. The image distributed using multicast from one display processor 100 may be received by another display processor 100 based on the control of the layout controller 10. There will be described an overview of the image transmission system 1 according to an embodiment of the present disclosure, which operates so that an image distributed using multicast from one display processor 100 may be received by another display processor 100.

FIG. 12 is an explanatory diagram illustrating a general process of the image transmission system 1 according to an embodiment of the present disclosure. FIG. 12 illustrates a general process of the image transmission system 1 when it operates to allow an image distributed using multicast from one display processor 100 to be received by another display processor 100.

For example, as illustrated in FIG. 12, an image outputted from the image sending terminal 20 is subjected to the image process by the display processors 100*a* to 100*d* and is distributed using IP multicast to the IP network 2. The images outputted from the display processors 100*a* to 100*d* are further subjected to the image process by other display processors 100*e* to 100*h* and are distributed using IP multicast to the IP network 2.

In this way, an image is distributed using multicast via the IP network 2, and thus the image transmission system 1 according to an embodiment of the present disclosure can cause one or more display processors 100 to perform the image process on the image outputted from the image sending terminal 20.

One or more display processors 100 can perform the image process on the image outputted from the image sending terminal 20, and thus the image transmission system 1 according to an embodiment of the present disclosure can output different images by changing the order of processing even when the same type of display processors 100 are combined with each other.

FIG. 13 is an explanatory diagram illustrating a general process of the image transmission system 1 according to an embodiment of the present disclosure. FIG. 13 illustrates a general process of the image transmission system 1 when it operates to allow an image distributed using multicast from one display processor 100 to be received by another display processor 100.

FIG. 13 illustrates display processors 100*a*, 100*b*, and 100*c*, and each display processor superimposes a plurality of inputted images and outputs the superimposed image. In addition, FIG. 13 illustrates the image sending terminals 20*a* to 20*d*, and each image sending terminal captures an image and outputs the captured image.

The display processor 100*a* receives an image distributed using IP multicast from the image sending terminals 20*a* and 20*b*, superimposes an image outputted from the image sending terminal 20*b* on an image outputted from the image sending terminal 20*a*, and distributes the superimposed image using IP multicast to the IP network 2.

The display processor 100*b* receives an image distributed using IP multicast from the image sending terminal 20*c* and the display processor 100*a*, superimposes an image outputted from the image sending terminal 20*c* on an image outputted from the display processor 100*a*, and distributes the superimposed image using IP multicast to the IP network 2.

The display processor 100*c* receives an image distributed using IP multicast from the image sending terminal 20*d* and the display processor 100*b*, superimposes an image outputted from the image sending terminal 20*d* on an image outputted from the display processor 100*b*, and distributes the superimposed image using IP multicast to the IP network 2.

The image is transmitted using IP multicast distribution as shown in FIG. 13, and thus there is generated an image in which the image outputted from the image sending terminal 20*a*, the image outputted from the image sending terminal 20*b*, the image outputted from the image sending terminal 20*c*, and the image outputted from the image sending terminal 20*d* are superimposed on one another in this order. Accordingly, the image transmission system 1 according to an embodiment of the present disclosure allows four superimposed images to be displayed on one display by performing the image process as shown in FIG. 13.

It is possible to output different images even in the combination of the same type of display processors 100*a*, 100*b*, and 100*c* by changing the processing order shown in FIG. 13.

FIG. 14 is an explanatory diagram illustrating a general process of the image transmission system 1 according to an embodiment of the present disclosure. FIG. 14 illustrates a general process of the image transmission system 1 when it operates to allow an image distributed using multicast from one display processor 100 to be received by another display processor 100.

FIG. 14 illustrates display processors 100*a*, 100*b*, and 100*c* as in the FIG. 13, and each display process superimposes a plurality of inputted images and outputs the superimposed image. In addition, FIG. 14 illustrates the image sending terminals 20*a* to 20*d* as in the FIG. 13, and each image sending terminal captures an image and outputs the captured image.

In the example shown in FIG. 13, the image process is performed in the order of the display processors 100*a*, 100*b*, and 100*c*, the image outputted from the image sending terminal 20*c* is outputted to the display processor 100*b*, and the image outputted from the image sending terminal 20*d* is outputted to the display processor 100c. In the example shown in FIG. 14, the image process is performed in the order of the display processors 100a, 100b, and 100c, and this arrangement is not different from that of FIG. 13. In the example shown in FIG. 14, however, the image outputted from the image sending terminal 20c is outputted to the display processor 100c, and the image outputted from the image sending terminal 20d is outputted to the display processor 100b, this arrangement is different from that of FIG. 13. The route from the image sending terminal to the display processor is set by a control signal from the layout controller 10.

The image is transmitted using IP multicast distribution as shown in FIG. 14, and thus there is generated an image in which the image outputted from the image sending terminal 20a, the image outputted from the image sending terminal 20b, the image outputted from the image sending terminal 20d, and the image outputted from the image sending terminal 20c are superimposed on one another in this order. In other words, from the example shown in FIG. 13, it is possible to output different images even in the combination of the same type of display processors 100a, 100b, and 100c, by changing the route from the image sending terminal to the display processor. This change of the processing order is performed only by changing the contents of the control signal from the layout controller 10, and thus it is not necessary to invoke a modification of wirings or recombination of devices.

FIGS. 13 and 14 illustrate an example of the image process performed by the display processors 100a, 100b, and 100c having the same function. Subsequently, an example of the image process performed by another display processor 100 will be described.

FIG. 15 is an explanatory diagram illustrating a general process of the image transmission system 1 according to an embodiment of the present disclosure. FIG. 15 illustrates a general process of the image transmission system 1 when it operates to allow an image distributed using multicast from one display processor 100 to be received by another display processor 100.

FIG. 15 illustrates the display processor 100a that changes the color of an inputted image, the display processor 100b that superimposes a plurality of inputted images and outputs the superimposed image, and the display processor 100c that rotates an inputted image. In addition, FIG. 15 illustrates the image sending terminals 20a to 20d, and each image sending terminal captures an image and outputs the captured image.

The display processor 100a receives an image distributed using IP multicast from the image sending terminal 20a, changes the color of the received image, and distributes the image using multicast to the IP network 2. The display processor 100b receives images distributed using IP multicast from the image sending terminal 20b and the display processor 100a, superimposes the image outputted from the image sending terminal 20b on the image outputted from the display processor 100a, and distributes the superimposed image using IP multicast to the IP network 2. The display processor 100c receives the image distributed using IP multicast from the display processor 100b, rotates the received image by a predetermined angle, and distributes the rotated image using IP multicast to the IP network 2.

FIG. 16 is an explanatory diagram illustrating the process of the image transmission system 1 according to an embodiment of the present disclosure shown in FIG. 15, by using an exemplary configuration of the image transmission system 1 according to an embodiment of the present disclosure shown in FIG. 1. In addition, FIG. 17 is an explanatory diagram illustrating the process of the image transmission system 1 according to an embodiment of the present disclosure shown in FIG. 15, by using a general process example as shown in FIG. 12.

As illustrated in FIGS. 16 and 17, the image outputted from the image sending terminal 20a is sent to the display processor 100a via the IP network 2, and the image is further outputted from the display processor 100a to the IP network 2.

The image outputted from the image sending terminal 20b is sent to the display processor 100b via the IP network 2 together with the image outputted to the IP network 2 from the display processor 100a, and the image is further outputted from the display processor 100b to the IP network 2.

Then, the image outputted from the display processor 100b is sent to the display processor 100c via the IP network 2, and the image is further outputted from the display processor 100c to the IP network 2.

With the transmission of images as shown in FIGS. 16 and 17, an image is subjected to the image process of a color change process, a superimposition process, and a rotation process in this order and is outputted to the image display system 45.

It is possible to output different images even in the combination of the same type of display processors 100a, 100b, and 100c, by changing the processing order of the display processors 100a, 100b, and 100c shown in FIGS. 15 to 17.

FIG. 18 is an explanatory diagram illustrating a general process of the image transmission system 1 according to an embodiment of the present disclosure. FIG. 18 illustrates a general process of the image transmission system 1 when it operates to allow an image distributed using multicast from one display processor 100 to be received by another display processor 100.

FIG. 18 illustrates the display processor 100a that changes the color of an inputted image, the display processor 100b that superimposes a plurality of inputted images and outputs the superimposed image, and the display processor 100c that rotates an inputted image. In addition, FIG. 18 illustrates the image sending terminals 20a to 20d, and each image sending terminal captures an image and outputs the captured image.

In the examples shown in FIGS. 15 to 17, the image process is performed in the order of the display processors 100a, 100b, and 100c. However, in the example shown in FIG. 18, the image process is performed in the order of the display processors 100c, 100b, and 100a. In other words, the processing order of image process is changed from the order of the color change process, the superimposition process, and the rotation process to the order of the rotation process, the superimposition process, and the color change process. Accordingly, in the example shown in FIG. 18, the image to be finally outputted is different from those of the examples shown in FIGS. 15 to 17. This processing order is set by the control signal from the layout controller 10.

In this way, the image transmission system 1 according to an embodiment of the present disclosure can output different images by changing the processing order even in the combination of display processors 100a, 100b, and 100c having different functions from each other. This change of the processing order is performed only by changing the contents of the control signal from the layout controller 10, and thus it is not necessary to invoke a modification of wirings or recombination of devices.

In this way, an image is distributed using multicast via the IP network 2, and thus it is possible to add or remove easily the display processor 100 later to or from the image transmission system 1 according to an embodiment of the present disclosure.

FIG. 19 is an explanatory diagram illustrating a general process of the image transmission system 1 according to an embodiment of the present disclosure. FIG. 19 illustrates a general process of the image transmission system 1 when it operates to allow an image distributed using multicast from one display processor 100 to be received by another display processor 100.

FIG. 19 illustrates a state where an additional display processor 100*d* is provided from the example of the general process shown in FIG. 15. The display processor 100*d* is a display processor which inverts an inputted image and outputs the inverted image. Then, in FIG. 19, there is illustrated a state where an image outputted from the display processor 100*b* is inputted to the display processor 100*d* and an image outputted from the display processor 100*d* is inputted to the display processor 100*c*.

In this way, even when an additional display processor 100*d* is provided, the change of the processing order is performed only by changing the contents of the control signal from the layout controller 10, and thus it is not necessary to invoke a modification of wirings or recombination of devices.

When an additional display processor 100*d* is provided to the image transmission system 1, information regarding the function of the additional display processor 100*d* is assumed to be registered in the layout controller 10 in advance. The registration of information regarding the function of the additional display processor 100*d* may be performed by the user of the layout controller 10. In addition, when an additional display processor 100*d* is provided to the IP network 2, the display processor 100*d* transmits (for example, broadcast transmission) information regarding its own function and the layout controller 10 receives the information, and thus this information may be registered in the layout controller 10.

FIG. 20 is an explanatory diagram illustrating a general process of the image transmission system 1 according to an embodiment of the present disclosure. FIG. 20 illustrates a general process of the image transmission system 1 when it operates to allow an image distributed using multicast from one display processor 100 to be received by another display processor 100.

FIG. 20 illustrates a state where an additional display processor 100*d* is provided from the example of the general process shown in FIG. 15. The display processor 100*d* is a display processor which inverts an inputted image and outputs the inverted image. Then, in FIG. 20, there is illustrated a state where an image outputted from the display processor 100*b* is inputted to both the display processor 100*c* and the display processor 100*d*.

In this way, even when a portion of the series of processes is performed in parallel by providing the additional display processor 100*d*, the change of the processing order is performed only by changing the contents of the control signal from the layout controller 10, and thus it is not necessary to invoke a modification of wirings or recombination of devices.

The layout controller 10 acquires information regarding the display processor 100 connected to the IP network 2 and holds it therein previously. If the processing order of the display processor 100 is changed, then the layout controller 10 generates a control signal by using the previously acquired information regarding the display processor 100 and sends the generated control signal to the respective display processors 100.

FIG. 21 is an explanatory diagram illustrating a functional configuration example of the layout controller 10 according to an embodiment of the present disclosure. As illustrated in FIG. 21, the layout controller 10 according to an embodiment of the present disclosure is configured to include a table holding unit 11. The table holding unit 11 holds the information regarding the display processor 100 connected to the IP network 2 in the form of a table.

In the present embodiment, although there is illustrated an example in which the layout controller 10 holds the information regarding the display processor 100 connected to the IP network 2, the present disclosure is not limited to such an example. The information regarding the display processor 100 connected to the IP network 2 may be held in another device which can be referred from the layout controller 10.

An example of a table stored in the table holding unit 11 will be described. An exemplary configuration of the image transmission system 1 is first illustrated to describe an example of a table stored in the table holding unit 11. FIG. 22 is an exemplary configuration of the image transmission system 1 according to an embodiment of the present disclosure, and this exemplary configuration is intended to describe an example of a table stored in the table holding unit 11. In FIG. 22, the image sending terminal 20 used to capture an image and output the captured image, the display processor 100, and the image display system 45 are illustrated. In FIG. 22, although the image receiving terminal 30 and the image output terminal 40 are not illustrated, it is assumed that they are included in the image transmission system 1.

There will be described reference numerals denoted in FIG. 22. NDn (n=1, 2, 3, ... ) is an ID for managing a node. MCn (n=1, 2, ... ) is an ID for managing a multicast address that is used when an image is outputted from each node. RTn (n=1, 2, ... ) is an ID for managing a route between nodes. In the example shown in FIG. 22, the image sending terminal 20 is managed as ND1, the display processor 100 is managed as ND2, and the image display system 45 is managed as ND3. In addition, a route from the image sending terminal 20 to the display processor 100 is managed as RT1, and a route from the display processor 100 to the image display system 45 is managed as RT2.

Furthermore, in the example shown in FIG. 22, an image is outputted from the image sending terminal 20 to a multicast address MC1, and an image is outputted from the display processor 100 to a multicast address MC2.

FIG. 23 is an explanatory diagram illustrating an example of a table stored in the table holding unit 11. FIG. 23 illustrates an example of a multicast address management table T1 which is used to manage a multicast address. An ID (serial number) for managing a multicast address when an image is outputted from each node is registered in the column of ID in the multicast address management table T1, and a multicast address corresponding to each ID is registered in the column of MulticastAddress in the multicast address management table T1.

FIG. 24 is an explanatory diagram illustrating an example of a table stored in the table holding unit 11. FIG. 24 illustrates an example of a node management table T2 which is used to manage a node. In the node management table T2, information regarding a node of the image sending terminal 20, the display processor 100, the image receiving terminal, or the like is managed. An ID (serial number) for managing each node is registered in the column of ID in the node management table T2, and a function of each node (camera, display processor, output display, or the like) is registered in the column of Function in the node management table T2, information regarding the number of ports for receiving an image is registered in the column of ReceivePort in the node management table T2, information regarding the number of ports for transmitting an image is registered in the column of SendPort in the node management table T2, and information regarding setting parameters for each node is registered in the column of Parameters in the node management table T2. An example of the information regarding the setting parameters for each node may include the horizontal and vertical size of an image, information on the number of frames per second (fps), information on codec, information on bandwidth, information on color space, or the like. In addition, although it is not shown in FIG. 24, information about the upper limit of the processing capability of each node may be stored in the node management table T2.

FIG. 25 is an explanatory diagram illustrating an example of a table stored in the table holding unit 11. FIG. 25 illustrates an example of a route management table T3 used to manage a route. The route management table T3 manages information on a route, that is, information about how an image is transmitted from which node to which node. An ID (serial number) for managing each route is registered in the column of ID in the route management table T3, the ID (serial number) managed in the multicast address management table T1 is registered in the column of MulticastAddressID in the route management table T3, and the ID (serial number) managed in the node management table T2 is registered in the columns of SenderNodeID and ReceiverNodeID in the route management table T3. An ID of a transmission source node of a corresponding route is registered in the column of SenderNodeID, and an ID of a transmission destination node of a corresponding route is registered in the column of ReceiverNodeID.

In a case where an image is distributed from one transmission node to a plurality of receiving nodes, the route management table T3 stores a plurality of rows, each having an identical multicast address and transmission node, but having different receiving nodes.

FIGS. 23 to 25 illustrate an example of each table when the image sending terminal 20 (node 1) sends an image to the multicast address 239.11.12.1 (address 1), the display processor 100 having a color change function (node 2) receives the image transmitted from the image sending terminal 20, performs a color change process on the received image, and sends the processed image to the multicast address 239.11.12.2 (address 2), and the image receiving terminal 30 (node 3) for receiving an image to be displayed on the image display system 45 receives the image transmitted from the display processor 100 and displays the received image.

The table holding unit 11 holds data as described above, and thus the layout controller 10 can cause the display processor 100 to receive an image outputted from the image sending terminal 20 and to perform the color change process on the received image, and cause the image receiving terminal 30 to receive the image outputted from the display processor 100.

There will be illustrated another example of a table stored in the table holding unit 11. The following description is an example of a table stored in the table holding unit 11 when an image is transmitted as shown in FIG. 15. In the following example, the image sending terminal 20a is managed as ND1, the image sending terminal 20b is managed as ND2, the display processor 100a is managed as ND3, the display processor 100b is managed as ND4, the display processor 100c is managed as ND5, and the image display system 45 (not shown in FIG. 15) that displays an image outputted from the display processor 100c is managed as ND6.

Furthermore, a route from the image sending terminal 20a to the display processor 100a is managed as RT1, a route from the display processor 100a to the display processor 100b is managed as RT2, a route from the image sending terminal 20b to the display processor 100b is managed as RT3, a route from the display processor 100b to the display processor 100c is managed as RT4, and a route from the display processor 100c to the image display system 45 is managed as RT5.

Moreover, the image sending terminal 20a outputs an image to a multicast address MC1, the display processor 100a outputs an image to a multicast address MC2, the image sending terminal 20c outputs an image to a multicast address MC3, the display processor 100b outputs an image to a multicast address MC4, and the display processor 100c outputs an image to a multicast address MC5.

FIG. 26 is an example of a multicast address management table T1 which is used to manage a multicast address when an image is transmitted as in FIG. 15. FIG. 27 is an example of a node management table T2 which is used to manage a node when an image is transmitted as in FIG. 15. In addition, FIG. 28 is an example of a route management table T3 which is used to manage a route when an image is transmitted as in FIG. 15.

The table holding unit 11 holds data as shown in FIGS. 26 to 28, and thus the layout controller 10 can transmit an image as in FIG. 15.

When an additional display processor 100d is necessary to be provided as in FIG. 20 in the state of transmitting an image as in FIG. 15, data of a table held in the table holding unit 11 may be added. In a case where the additional display processor 100d is provided as in FIG. 20, the display processor 100d is managed as ND7 and the image display system 45 (not shown in FIG. 20) that displays an image outputted from the display processor 100c is managed as ND8.

Furthermore, a route from the display processor 100b to the display processor 100d is managed as RT6, and a route from the display processor 100d to the image display system 45 is managed as RT7. In addition, the display processor 100d outputs an image to a multicast address MC6.

FIG. 29 is an example of a multicast address management table T1' which is used to manage a multicast address when an additional display processor 100d is provided and an image is transmitted as in FIG. 20. FIG. 30 is an example of a node management table T2' which is used to manage a node when an additional display processor 100d is provided and an image is transmitted as in FIG. 20. In addition, FIG. 31 is an example of a route management table T3' which is used to manage a route when an additional display processor 100d is provided and an image is transmitted as in FIG. 20.

FIGS. 29 to 31 illustrate only the differences from the data shown in FIGS. 26 to 28, respectively. A newly added display processor 100d receives an image outputted from ND4, that is, the display processor 100b by using the existing multicast address MC4. Accordingly, only information regarding the route RT6 from the display processor 100b to the display processor 100d may be added to the route management table T3, and the multicast address regarding the route RT6 is not necessary to be added to the multicast address management table T1.

The layout controller 10 can transmit an image in a state where an additional display processor 100d is provided as in FIG. 20, by allowing data as shown in FIGS. 29 to 31 to be added to the table holding unit 11.

In this way, it is possible easily to change the order of image process or to add a new image process, by causing an image outputted from a certain display processor 100 using multicast distribution to be received by another display processor 100 and then to be displayed on the image display system 45.

The image process performed by the display processor 100 may include a process which can be completed in a short time, but may include a process which is necessary to take the considerable time to complete. Accordingly, there is a possibility of delay in the time period from when an image is outputted to when the image is displayed, depending on the contents of the process or a transmission path of image. The image display system 45 is composed of a plurality of image display devices 50, and the display process 100 generates an image for each image display device 50. If the display processor 100 performs the same process for all of the image display devices 50 and the same delay time occurs for all of the image display devices 50 due to the process by the display processor 100, this means just that the image is uniformly delayed and displayed. However, if timings of displaying the images do not match, images displayed on the image display system 45 will be shifted between the image display devices 50.

FIG. 32 is an explanatory diagram illustrating an example of a case where the delay times are not coincident with each other for all of the routes from the image sending terminal 20 to the image display system 45. The numeric character indicated in each of the display processors 100a to 100e represents the time it takes for each of the display processors 100a to 100e to perform the image process. The time taken to perform the image process is normalized for the purpose of illustration, and it is assumed that a time unit is not specified.

For example, in an example shown in FIG. 32, the time it takes for each of the display processors 100a to 100d to perform the image process is "5", but the time it takes for the display processor 100e to perform the image process is "20". In a case where an image is transmitted as shown in FIG. 32, if there are no measures, the image on the image display device 50 at the upper right corner of the image display system 45 will be displayed with a delay of time "20", as compared to images on other image display devices 50.

Thus, in the image transmission system 1 according to an embodiment of the present disclosure, there will be described a method of displaying an image by taking into account the delay due to the image process in the display processor 100 and by matching the timings for all of the image display devices 50 in the image display system 45.

A method of matching the timings for all of the image display devices 50 in the image display system 45 will be described below by three examples.

A method of matching the timings for all of the image display devices 50 in the image display system 45 may include, for example, a method of adjusting the output timing of images by the display processor 100. The output timing of images may be adjusted by providing a buffer inside each of the display processors 100a to 100d having a relatively shorter processing time, which are shown in FIG. 32.

A method of matching the timings for all of the image display devices 50 in the image display system 45 may include, for example, a method of adjusting the output timing of images in the image sending terminal 20 or the image receiving terminal 30 (not shown in FIG. 32). The output timing of images may be adjusted by providing a buffer inside the image sending terminal 20 or the image receiving terminal 30.

A method of matching the timings for all of the image display devices 50 in the image display system 45 may include, for example, a method of connecting a dedicated device for adjusting delay of images to the IP network 2. In other words, this method can be regarded as a method of connecting the display processor 100 that performs the image process of adjusting delay of images to the IP network 2.

In order to implement these methods, the layout controller 10 may grasp information regarding the processing time of each display processor 100 or information regarding the route from the image sending terminal 20 to the image receiving terminal 30. The layout controller 10 can determine the amount of adjusting delay or a device by which the adjustment is to be performed by grasping these kinds of information.

FIG. 33 is an explanatory diagram illustrating an exemplary functional configuration of the layout controller 10 according to an embodiment of the present disclosure. FIG. 33 illustrates an exemplary functional configuration of the layout controller 10 in which a delay control unit 12 for calculating delay time is added to an exemplary functional configuration of the layout controller 10 shown in FIG. 21.

The delay control unit 12 performs delay control such as determination of the amount of adjusting delay or a device by which the adjustment is to be performed, based on the information on the processing time of each display processor 100 or the information on the route from the image sending terminal 20 to the image receiving terminal 30. The delay control unit 12 can use information held in the table holding unit 11 when it performs the delay control. The table holding unit 11 includes the node management table T2 which is used to manage a node and the route management table T3 which is used to manage a route, as described above. The delay control unit 12 can use data stored in the node management table T2 or the route management table T3 when it performs the delay control.

FIG. 34 is a flowchart showing an exemplary operation of the layout controller 10 according to an embodiment of the present disclosure. The flowchart shown in FIG. 34 is an exemplary operation of the layout controller 10 when the delay control unit 12 performs the delay control.

When the delay control unit 12 starts the delay control, a variable which is used to store a number of the display processor 100 is initialized to 1 by the delay control unit 12 (step S201). In this step, the variable is initialized to 1, but an initial value may be other values.

After the delay control unit 12 initializes the variable in step S201, the delay control unit 12 instructs the display processor 100 to notify the contents of the image process (step S202). The delay control unit 12 may determine a display processor 100 to perform the notification for the first time based on data stored in the node management table T2. Specifically, the delay control unit 12 may select a display processor having the lowest ID as the display processor 100 to perform the notification for the first time, from among nodes registered as the display processors in the node management table T2.

When the delay control unit 12 receives a report for the process delay time from the display processor 100 determined in step S202 (step S203), the delay control unit 12 determines whether an investigation of the process delay time for all of the display processors 100 is completed (step S204). If it is determined that there remains a display process 100 which is not yet investigated from the determination result obtained in step S204, the delay control unit 12 increments the variable by one (step S205) and then is returned to the process of step S202. On the other hand, if it is determined that an investigation of the process delay time for all of the display processors 100 is completed from the determination result obtained in step S204, the delay control unit 12 extracts a route having the longest process delay time among the routes from the image sending terminal 20 to the image receiving terminal 30 and then calculates a process delay time in the extracted route (step S206).

For example, when an image is transmitted as in FIG. 32, a route having the longest process delay time is the route passing through the display processors 100a and 100e, and its delay time is "25".

Subsequently, the delay control unit 12 calculates a delay adjustment time for each route from the image sending terminal 20 to the image receiving terminal 30 (step S207). The delay adjustment time for each route is obtained by subtracting a process delay time for each route from the longest process delay time calculated in step S206.

For example, when an image is transmitted as in FIG. 32, the adjustment time of the route passing through only each of the display processors 100b, 100c, and 100d is "20" which is obtained by subtracting the process delay time of "5" in the display processors 100b, 100c, and 100d from the longest process delay time of "25".

Subsequently, the delay control unit 12 sets the delay adjustment time calculated in step S207 for the display processor 100 on each route from the image sending terminal 20 to the image receiving terminal 30 (step S208).

For example, when an image is transmitted as in FIG. 32, the delay control unit 12 sets the delay adjustment time for each of the display processors 100b, 100c, and 100d to be "20" calculated in step S207. On the other hand, the delay control unit 12 does not set the delay adjustment time for the display processors 100a and 100e.

With such an operation, the layout controller 10 according to an embodiment of the present disclosure can display an image by taking into account the delay due to the image process by the display processor 100 and by matching the timings for all of the image display devices 50 in the image display system 45.

Although there has been described a simple example in the above, it can be considered an example in which a long process time is included during the process of an image, that is, in the middle of the route passing through three or more display processors 100, or a more complicated combination to which an image synthesis or the like that matches a vertical synchronization (V sync) is applied. Even in such a case, it is possible to eliminate the display time difference between the image display devices 50 and to display an image in a state where the timings for all of the image display devices 50 in the image display system are matched, by combining the adjustment of delay due to the layout controller 10, the image sending terminal 20 or image receiving terminal 30 (for delay adjustment), and the display processor 100.

(2. Summary)

As described above, according to an embodiment of the present disclosure, there is provided the display processor 100 which receives an image transmitted from the image sending terminal 20 which distributes an image using IP multicast based on an instruction from the layout controller 10. When the display processor 100 receives an image distributed using IP multicast from the image sending terminal 20, it performs a predetermined image process on the received image and re-sends the processed image using IP multicast distribution. The image distributed using IP multicast from the display processor 100 is received by the image receiving terminal 30 and is displayed on the image display system 45, based on an instruction from the layout controller 10.

Furthermore, according to an embodiment of the present disclosure, it is possible to cause an image outputted using IP multicast distribution from one display processor 100 to be received by another display processor 100. In addition, the display processor 100 distributes an image using IP multicast, and thus, according to an embodiment of the present disclosure, it is possible to change easily the processing order of the display processors 100 by an instruction from the layout controller 10.

Moreover, according to an embodiment of the present disclosure, it is possible for the layout controller 10 to calculate a process delay time for each route and to cause each display processor 100 to adjust a delay adjustment time so that an image to be displayed is not shifted between the image display devices.

It is not necessary for each step in the process performed by each device described in the present specification to be processed in a time series according to the order described in the sequence diagram or flowchart. For example, each step in the process performed by each device may be processed in the order different from the order described as the flowchart, or may be processed in parallel.

Moreover, it is also possible to create a computer program for causing hardware such as CPU, ROM, and RAM incorporated in each device to exert the function equivalent to the configuration of each device described above. In addition, there may also be provided a recording medium having the computer program recorded thereon. Furthermore, a sequence of processing can be implemented by hardware by configuring each functional block shown as the functional block diagram by hardware.

Although preferred embodiments of the present disclosure are described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

An image transmission system, the system comprising:
at least one image sending terminal configured to transmit image signals using multicast transmission;
a plurality of display processors configured to respectively receive the image signals transmitted according to the multicast transmission, each image signal corresponding to at least a portion of at least one display image, and to respectively process the image signals according to image control information to produce the display image.

(2)

The image transmission system according to (1), wherein the display processors are configured to sequentially process the image signals according to the control information to produce the display image.

(3)

The image transmission system according to (2), wherein the sequential processing by the display processors applies a sequence including a plurality of image processes.

(4)

The image transmission system according to (3), further comprising:
a controller configured to provide the control information to the plurality of display processors to control the sequence in which the plurality of image process are applied to the display image.

(5)

The image transmission system according to (3), wherein the sequence of image processes comprises a first display processor applying a first image process and a second display processor applying a second image process, the first image process being different from the second image process.

(6)

The image transmission system according to (5), wherein the sequence of image processes comprises a third display processor applying a third image process, wherein the first, second and third image processes are different from each other.

(7)

The image transmission system according to (6), wherein the control information is configurable to control the sequence of image processes such that the sequence is configurable for multiple different orders of the first, second, and third image processes.

(8)

The image transmission system according to (1),
wherein a first display image and a second display image are processed by the display processors according to the image control information,
a first display processor being configured to apply a first image process, a second display processor being configured to apply a second image process, and a third display processor being configured to apply a third image process, and
wherein a first subset of the first, second and third image processes is applied to the first display image, and a second subset of the first, second and third image processes is applied to the second display image, the first subset being different from the second subset.

(9)

The image transmission according to (8), wherein the first and second display images are respectively transmitted to the display processors by first and second sending terminals using multicast transmission.

(10)

A display processor comprising:
an interface for receiving image signals from at least one sending terminal, the image signals also having been transmitted to other display processors according to multicast transmission, each of the image signals corresponding to at least a portion of at least one display image; and
a processing unit, configured to process the image signals according to image control information to produce the at least one display image.

(11)

The display processor according to (10), wherein the display processor is configured to sequentially process the image signals, along with the other display processors, according to the control information to produce the display image.

(12)

The display processor according to (11), wherein the sequential processing by the display processors applies a sequence including a plurality of image processes.

(13)

The display processor according to (12), wherein the display processor is configured to receive, from a controller, the image control information to control the sequence in which the plurality of image process are applied to the display image.

(14)

The display processor according to (12), wherein the sequence of image processes comprises a first image process applied by the display processor, and a second image process applied by at least one of the other display processors.

(15)

The display processor according to (14), wherein the sequence of image processes comprises a third image process applied by at least one of the other display processors, wherein the first, second and third image processes are different from each other.

(16)

The display processor according to (15), wherein the control information is configurable to control the sequence of image processes such that the sequence is configurable for multiple different orders of the first, second, and third image processes.

(17)

The display processor according to claim (10),
wherein a first display image and a second display image are processed by the display processor and the other display processors according to the image control information, the display processor being configured to apply a first image process, a second display processor being configured to apply a second image process, and a third display processor being configured to apply a third image process, and
wherein a first subset of the first, second and third image processes is applied to the first display image, and a second subset of the first, second and third image processes is applied to the second display image, the first subset being different from the second subset.

(18)

The display processor according to (17), wherein the first and second display images are respectively received by the display processors from first and second sending terminals via multicast transmission.

(19)

A sending terminal comprising:
an interface for transmitting image signals to a display processor, the image signals also being transmitted to other display processors according to multicast transmission by other sending terminals, each of the image signals corresponding to at least a portion of at least one display image; and
a processing unit, configured to process the image signals according to image control information to produce the at least one display image.

(20)

The sending terminal according to (19), wherein the display processor is configured to sequentially process the image signals, along with the other display processors, according to the control information to produce the display image.

(21)

The sending terminal according to (20), wherein the sequential processing by the display processors applies a sequence including a plurality of image processes.

(22)

The sending terminal according to (21), wherein the sequence of image processes comprises a first image process applied by the display processor, and a second image process applied by at least one of the other display processors.

(23)

The sending terminal according to (10), wherein a first display image and a second display image are processed by the display processor and the other display processors according to the image control information, the display processor being configured to apply a first image process, a second display processor being configured to apply a second image process, and a third display processor being configured to apply a third image process, and wherein a first subset of the first, second and third image processes is applied to the first display image, and a second subset of the first, second and third image processes is applied to the second display image, the first subset being different from the second subset.

(24)

The sending terminal according to (23), wherein the first and second display images are respectively received by the display processors from first and second sending terminals via multicast transmission.

(25)

An image processing method, the method comprising: receiving, by a plurality of display processors, image signals from at least one sending terminal, the image signals having been transmitted to the display processors according to multicast transmission, each of the image signals corresponding to at least a portion of at least one display image; and processing the image signals, respectively by the display processors, according to image control information to produce the at least one display image.

(26)

An image transmission system including:
an image control device; and
at least two signal processing devices,
wherein the signal processing devices each include
an image receiver configured to selectively receive one or more images transmitted using multicast based on image control information transmitted from the image control device,
one or more image processing units configured to perform an image process on an image received by the image receiver based on the image control information, and
an image sender configured to transmit an image subjected to the image process by the image processing unit based on the image control information, the image being transmitted using multicast, and
wherein the image control device selects a first signal processing device and a second signal processing device from among the at least two signal processing devices and generates the image control information used to cause an image transmitted using multicast from the image sender by the first signal processing device to be received by the image receiver of the second signal processing device.

(27)

The image transmission system according to (26), wherein the image control device specifies an output destination multicast address from the first signal processing device.

(28)

The image transmission system according to (26) or (27), wherein the number of the signal processing devices is at least three, and
wherein the image control device further selects a third signal processing device from among the at least three signal processing devices and determines a transmission order of an image for the first signal processing device, the second signal processing device, and the third signal processing device.

(29)

The image transmission system according to any one of (26) to (28), wherein the image control device adjusts a transmission timing of an image from the image sender based on information on processing time in the image processing unit of each of the signal processing devices.

(30)

The image transmission system according to (29), wherein the image control device adjusts the transmission timing of an image from the image sender by using information on a route from each of the signal processing devices to the image receiver and the information on processing time obtained from each of the signal processing devices.

(31)

The image transmission system according to any one of (26) to (31), wherein the image control device includes a route information holding unit configured to hold information on a route from each of the signal processing devices to the image receiver.

(32)

An image transmission method including:
a step of selecting a first signal processing device and a second signal processing device from among at least two signal processing devices;
a step of generating image control information used to cause an image transmitted using multicast from the first signal processing device to be received by the second signal processing device;
a selectively-receiving step of selectively receiving one or more images transmitted using multicast based on the image control information;
a performing-an-image-process step of performing an image process on the image received in the selectively-receiving step, based on the image control information; and
a step of transmitting the image subjected to the image process in the performing-an-image-process step, based on the image control information, the image being transmitted using multicast.

REFERENCE SIGNS LIST

1 image transmission system
10 layout controller
11 table holding unit
12 delay control unit
20 image sending terminal
30 image receiving terminal
40 image output terminal
45 image display system
50 image display device
100 display processor
102 control signal control unit
104 multicast reception control unit
106 image editing management unit
108 multicast transmission control unit
110 image receiver
112a-112d decoder
114a, 114b image editing processing unit
116a, 116b encoder
118 image sender

The invention claimed is:

1. An image transmission system, comprising:
   an image display apparatus;
   at least one image sending terminal of a plurality of image sending terminals configured to transmit first image data based on multicast transmission;
   a controller configured to transmit image control information comprising image position information of a display image; and
   a plurality of display processors, wherein each display processor of the plurality of display processors comprises:
      a reception circuit configured to:
         receive the first image data, based on the multicast transmission; and
         receive the image control information from the controller,
      a plurality of decoders configured to:
         decode the first image data to generate second image data; and
         output the second image data to a plurality of image processing circuits based on the image control information; and
      each image processing circuit of the plurality of image processing circuits configured to:
         process the second image data based on the image control information to produce third image data, wherein the third image data corresponds to a plurality of segments of the display image; and
         generate an arrangement matrix for the third image data, based on the image position information,
         wherein the arrangement matrix corresponds to a plurality of display positions of the plurality of segments of the display image,
         wherein each display position of the plurality of display positions corresponds to a position of a respective display screen of a plurality of screens on the image display apparatus, and
         wherein the image display apparatus is configured to control each screen of the plurality of screens to display a respective segment of the plurality of segments of the display image, based on the arrangement matrix.

2. The image transmission system according to claim 1, wherein the plurality of display processors is further configured to sequentially process the second image data based on the image control information to produce the third image data.

3. The image transmission system according to claim 1, wherein each of the plurality of display processors is further configured to process the second image data in a sequence of a plurality of image processes to produce the third image data.

4. The image transmission system according to claim 3, wherein the controller is further configured to transmit the image control information to each display processor of the plurality of display processors, and
   wherein the image control information further comprises sequence information to control the sequence of the plurality of image processes.

5. The image transmission system according to claim 3, wherein a first display processor of the plurality of display processors is configured to apply a first image process, and a second display processor of the plurality of display processors is configured to apply a second image process based on the sequence of the plurality of image processes, and
   wherein the first image process is different from the second image process.

6. The image transmission system according to claim 5, wherein a third display processor of the plurality of display processors is configured to apply a third image process based on the sequence of the plurality of image processes, and
   wherein the first image process, the second image process, and the third image process are different from each other.

7. The image transmission system according to claim 6, wherein the controller is further configured to control the sequence of the plurality of image processes such that the sequence comprises multiple different orders of the first image process, the second image process, and the third image process.

8. The image transmission system according to claim 1, wherein the plurality of display processors are further configured to produce a first display image and a second display image based on the image control information,
   wherein a first display processor of the plurality of display processors is configured to apply a first image process, a second display processor of the plurality of display processors is configured to apply a second image process, and a third display processor of the plurality of display processors is configured to apply a third image process,
   wherein a first subset of the first image process, the second image process, and the third image process corresponds to the first display image, and a second subset of the first image process, the second image process, and the third image process corresponds to the second display image, and
   wherein the first subset is different from the second subset.

9. The image transmission system according to claim 8, wherein a first sending terminal of the plurality of image sending terminals is configured to transmit fourth image data to at least one of the plurality of display processors based on the multicast transmission, and
   wherein a second sending terminal of the plurality of image sending terminals is configured to transmit fifth image data to the at least one of the plurality of display processors based on the multicast transmission.

10. A first display processor, comprising:
    reception circuitry configured to:
       receive first image data from at least one sending terminal of a plurality of sending terminals, based on multicast transmission; and
       receive image control information from a controller,
       wherein the image control information comprises image position information of a display image,
    a plurality of decoders configured to:
       decode the first image data to generate second image data; and
       output the second image data to a plurality of image processing circuits based on the image control information; and
    an image processing circuit of the plurality of image processing circuits configured to:
       process the second image data based on the image control information to produce third image data,
       wherein the third image data corresponds to a plurality of segments of the display image; and
       generate an arrangement matrix for the third image data, based on the image position information, wherein the arrangement matrix corresponds to a plurality of display positions of the plurality of segments of the display image, wherein each display position of the plurality of display positions corresponds to a position of a respective display screen of a plurality of screens on an image display apparatus, and wherein the image display apparatus is configured to control each screen of the plurality of screens to display a respective segment of the plurality of segments of the display image, based on the arrangement matrix.

11. The first display processor according to claim 10, wherein the image processing circuit is further configured to sequentially process the second image data, along with at least one second display processor based on the image control information, to produce the third image data.

12. The first display processor according to claim 10, wherein the image processing circuit is further configured to process the second image data in a sequence of a plurality of image processes to produce the third image data.

13. The first display processor according to claim 10, wherein the image control information further comprises sequence information to control a sequence of a plurality of image processes.

14. The first display processor according to claim 10,
wherein the image processing circuit is further configured to apply a first image process of a plurality of image processes to the second image data, and
wherein at least one second display processor is configured to apply a second image process of the plurality of image processes, based on a sequence of the plurality of image processes.

15. The first display processor according to claim 14,
wherein the sequence of the plurality of image processes comprises a third image process,
wherein the at least one second display processor applies the third image process, and
wherein the first image process, the second image process and the third image process are different from each other.

16. The first display processor according to claim 15, wherein the controller is further configured to control the sequence of the plurality of image processes such that the sequence comprises multiple different orders of the first image process, the second image process, and the third image process.

17. The first display processor according to claim 10, wherein
the image processing circuit is further configured to:
produce a first display image based on the image control information; and
apply a first image process,
a second display processor is configured to:
produce a second display image based on the image control information and apply a second image process,
a third display processor is configured to apply a third image process,
wherein a first subset of the first image process, the second image process, and the third image process is for the first display image, and a second subset of the first image process, the second image process, and the third image process is for the second display image, and
wherein the first subset is different from the second subset.

18. The first display processor according to claim 17,
wherein the image processing circuit is further configured to receive fourth image data from a first sending terminal of the plurality of sending terminals, based on the multicast transmission, and
wherein the second display processor is configured to receive fifth image data from a second sending terminal of the plurality of sending terminals, based on the multicast transmission.

19. A sending terminal, comprising:
circuitry configured to:
transmit first image data to a first display processor of a plurality of display processors, based on multicast transmission, wherein the first display processor comprises:
a plurality of decoders configured to:
decode the first image data to generate second image data; and
output the second image data to a plurality of images processing circuits based on image control information, and
each image processing circuit of the plurality of images processing circuits configured to:
process the second image data based on the image control information to produce third image data,
wherein the image control information comprises image position information of a display image, and
wherein the third image data corresponds to a plurality of segments of the display image; and
generate an arrangement matrix for the third image data, based on the image position information,
wherein the arrangement matrix corresponds to a plurality of display positions of the plurality of segments of the display image,
wherein each display position of the plurality of display positions corresponds to a position of a respective display screen of a plurality of screens on an image display apparatus, and
wherein the image display apparatus is configured to control each screen of the plurality of screens to display a respective segment of the plurality of segments of the display image, based on the arrangement matrix.

20. The sending terminal according to claim 19, wherein the first display processor is further configured to sequentially process the second image data, along with at least one second display processor based on the image control information to produce the third image data.

21. The sending terminal according to claim 19, wherein the first display processor is further configured to process the second image data in a sequence of a plurality of image processes to produce the third image data.

22. The sending terminal according to claim 19, wherein the first display processor is further configured to apply a first image process of a plurality of image processes, and at least one second display processor of the plurality of display processors is configured to apply a second image process of the plurality of image processes, based on a sequence of the plurality of image processes.

23. The sending terminal according to claim 19,
wherein the first display processor is further configured to produce a first display image based on the image control information,
wherein at least one second processor of the plurality of display processors is configured to produce a second display image based on the image control information, wherein
the first display processor is further configured to apply a first image process,
a second display processor of the at least one second processor is configured to apply a second image process,
a third display processor of the at least one second processor is configured to apply a third image process,
wherein a first subset of the first image process, the second image process, and the third image process is for the first display image, and a second subset of the first image process, the second image process, and the third image process is for the second display image, and
wherein the first subset is different from the second subset.

24. The sending terminal according to claim 23,
wherein the first display processor is further configured to receive fourth image data from a first sending terminal based on the multicast transmission, and
wherein the second display processor is configured to receive fifth image data from a second sending terminal based on the multicast transmission.

25. An image processing method, comprising:
in a display processor comprising reception circuitry, a plurality of decoders, and a plurality of image processing circuits:
receiving, by the reception circuitry, first image data from at least one sending terminal, based on multicast transmission;
receiving, by the reception circuitry, image control information from a controller,
wherein the image control information comprises image position information of a display image;
decoding, by the plurality of decoders, the first image data to generate second image data;
outputting, by the plurality of decoders, the second image data to the plurality of image processing circuits based on the image control information;
processing, by the plurality of image processing circuits, the second image data, based on the image control information to produce third image data,
wherein the third image data corresponds to a plurality of segments of the display image; and
generating, by the plurality of image processing circuits, an arrangement matrix for the third image data, based on the image position information,
wherein the arrangement matrix corresponds to a plurality of display positions of the plurality of segments of the display image,
wherein each display position of the plurality of display positions corresponds to a position of a respective display screen of a plurality of screens on an image display apparatus; and
controlling each screen of the plurality of screens to display a respective segment of the plurality of segments of the display image, based on the arrangement matrix.

26. An image transmission system, comprising:
an image display apparatus;
an image control device; and
at least two signal processing devices of a plurality of signal processing devices, wherein each signal processing device of the at least two signal processing devices includes:
a first image receiver configured to receive via multicast transmission, a first plurality of images, based on image control information from the image control device, wherein the image control information comprises image position information;
a plurality of decoders configured to:
decode the first plurality of images to generate a second plurality of images; and
output the second plurality of images based on the image control information,
circuitry configured to:
process a first image of the second plurality of images based on the image control information to produce a second image,
wherein the second image has a plurality of segments; and
generate an arrangement matrix for the second image, based on the image position information,
wherein the arrangement matrix corresponds to a plurality of display positions of the plurality of segments of the second image, and
wherein each display position of the plurality of display positions corresponds to a position of a respective display screen of a plurality of display screens on the image display apparatus; and
an image sender configured to transmit the second image, based on the multicast transmission,
wherein the image display apparatus is configured to display the second image on the respective display screen of the plurality of display screens; and
wherein the image control device is configured to:
select a first signal processing device and a second signal processing device from the at least two signal processing devices; and
generate the image control information based on the selection.

27. The image transmission system according to claim 26, wherein the image control device is further configured to specify an output destination multicast address of the first signal processing device.

28. The image transmission system according to claim 26, further comprising a third signal processing device of the plurality of signal processing devices,
wherein the image control device is further configured to:
select the third signal processing device, and
determine a transmission order of the second plurality of images for the first signal processing device, the second signal processing device, and the third signal processing device.

29. The image transmission system according to claim 26, wherein the image control device is further configured to:
obtain first information from the circuitry of each signal processing device of the at least two signal processing devices; and
adjust a transmission timing of the second image based on the first information,
wherein the first information indicates processing time of each signal processing device of the at least two signal processing devices.

30. The image transmission system according to claim 29, wherein the image control device is further configured to adjust the transmission timing of the second image based on second information, and
wherein the second information corresponds to a first route from the first signal processing device to the second signal processing device.

31. The image transmission system according to claim 26, wherein the image control device is further configured to store route information of a route.

32. An image transmission method, comprising:
in an image transmission system:
- selecting a first signal processing device and a second signal processing device from at least two signal processing devices;
- generating image control information based on the selection,
  - wherein the image control information comprises image position information of a second image, and
  - wherein a first image sender of the first signal processing device transmits a first image, based on multicast transmission, to a second image receiver of the second signal processing device;
- decoding, by a plurality of decoders, the first image to generate the second image;
- outputting, by the plurality of decoders, the second image to a plurality of image processing circuits based on the image control information;
- processing, by the plurality of image processing circuits, the second image based on the image control information to produce a third image,
  - wherein the third image comprises a plurality of segments;
- generating, by the plurality of image processing circuits, an arrangement matrix for the third image, based on the image position information,
  - wherein the arrangement matrix corresponds to a plurality of display positions of the plurality of segments of the third image, and
  - wherein each display position of the plurality of display positions corresponds to a position of a respective display screen of a plurality of display screens on an image display apparatus;
- transmitting the third image based on the multicast transmission; and
- displaying the third image on the respective display screen of the plurality of display screens, based on the arrangement matrix.

* * * * *